United States Patent [19]

Miller et al.

[11] Patent Number: 5,102,609
[45] Date of Patent: Apr. 7, 1992

[54] PROCESS FOR FORMING FIBER COMPOSITE MATERIALS

[75] Inventors: Alan K. Miller, Santa Cruz; Karthik Ramani, Stanford; Micha M. Gur, Palo Alto, all of Calif.

[73] Assignee: The Board of Trustees of the Leland Stanford Junior University, Stanford, Calif.

[21] Appl. No.: 566,779

[22] Filed: Aug. 14, 1990

Related U.S. Application Data

[60] Division of Ser. No. 259,256, Oct. 18, 1988, Pat. No. 4,955,803, which is a continuation-in-part of Ser. No. 825,337, Feb. 3, 1986, Pat. No. 4,777,005.

[51] Int. Cl.⁵ .................................. B29C 53/04
[52] U.S. Cl. ........................ 264/339; 264/285; 264/340; 425/363; 425/367; 425/394; 425/397; 425/115
[58] Field of Search ............... 264/339, 40.7, 40.1, 264/285, 295, 332, 340; 425/394, 363, 366, 367, 394, 397, 115

[56] References Cited

U.S. PATENT DOCUMENTS

| | | | |
|---|---|---|---|
| 3,278,355 | 10/1966 | Borup | 264/339 |
| 3,992,505 | 11/1976 | Tally | 264/339 |
| 4,746,386 | 5/1988 | Sato | 264/339 |
| 4,777,005 | 10/1988 | Miller | 264/339 |
| 4,955,803 | 9/1990 | Miller | 264/339 |

FOREIGN PATENT DOCUMENTS

| | | | |
|---|---|---|---|
| 2362465 | 12/1973 | Fed. Rep. of Germany | 264/295 |
| 0039523 | 3/1984 | Japan | 264/295 |

Primary Examiner—Jay H. Woo
Assistant Examiner—Jeremiah F. Durkin, II
Attorney, Agent, or Firm—Gregory Garmong

[57] ABSTRACT

A process for continuously and progressively forming components from fiber-containing composite material workpieces having a deformable matrix introduces transverse bends into a workpiece that moves through the apparatus in a longitudinal or travel direction. Transverse bending of the composite material is accomplished in a kinematically admissible manner to avoid misalignment or failure of the composite material. A net bending deformation is introduced at a free transverse edge as the composite workpiece moves in a longitudinal direction, by pairs of compound roller elements between which the workpiece passes as it moves through the apparatus. The net deformation introduced at the free transverse edge is moved and distributed through the composite material workpiece during successive passes through the forming machinery, to form the final shaped component.

15 Claims, 13 Drawing Sheets

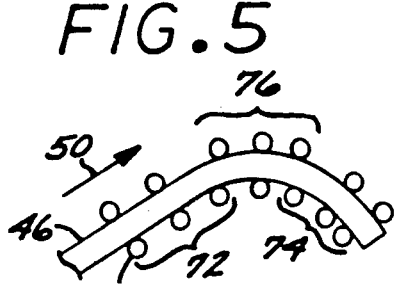
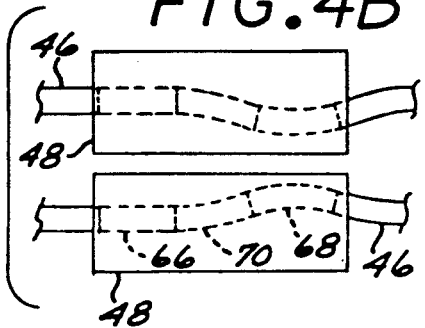
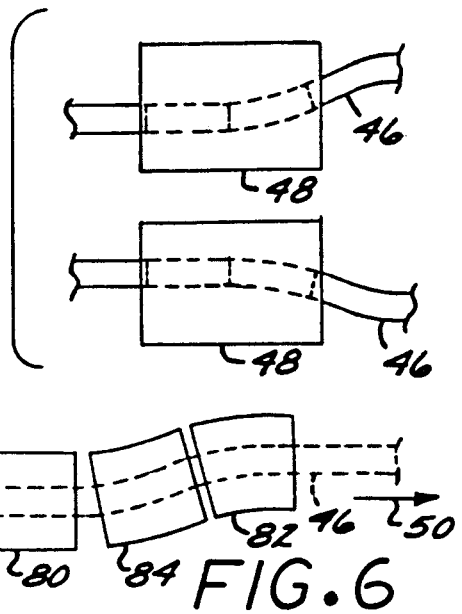
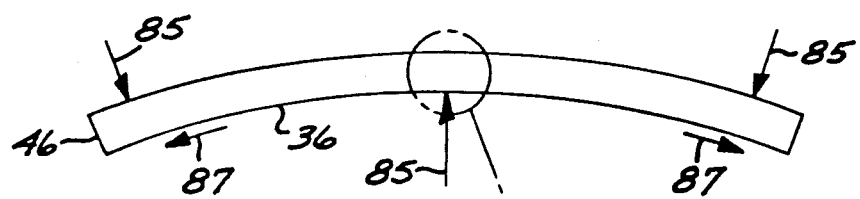
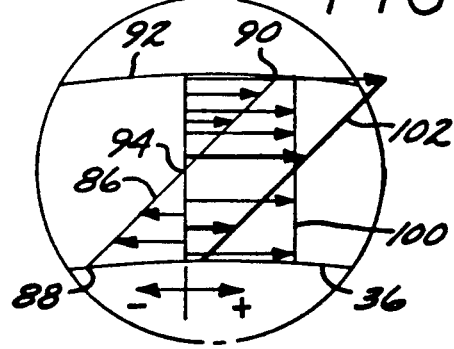
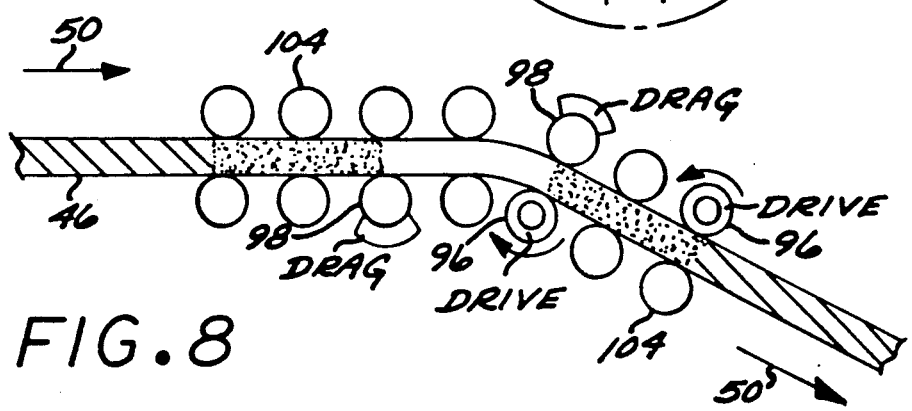

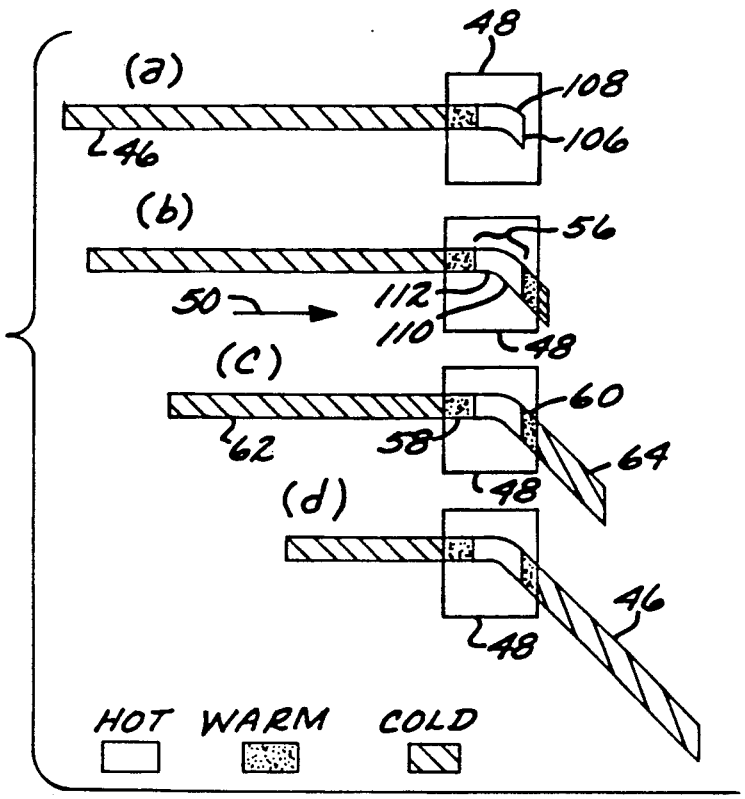
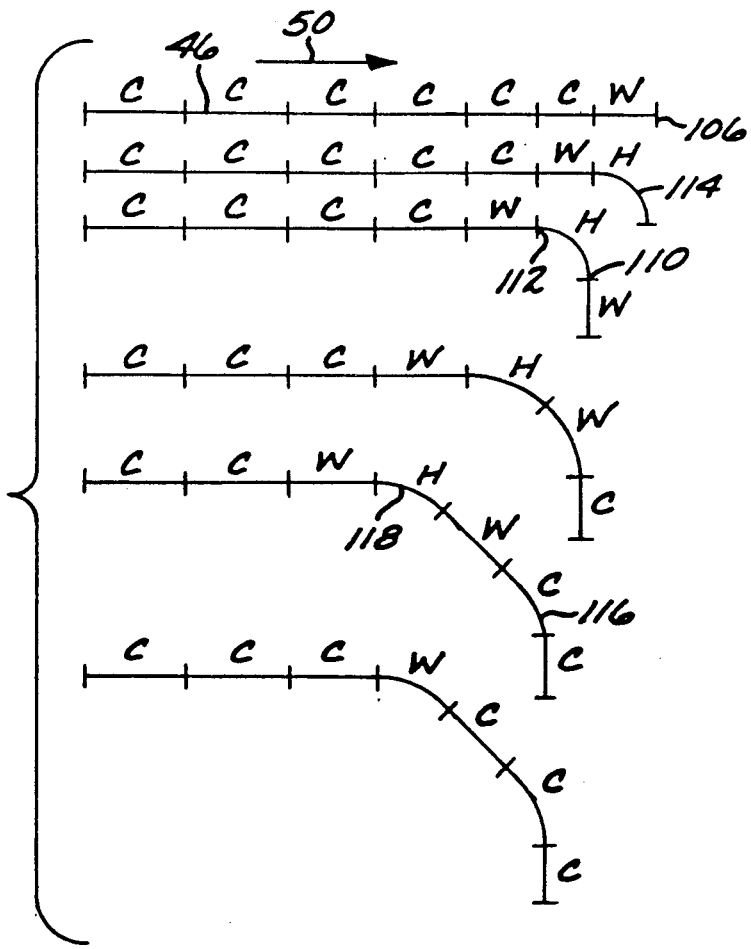

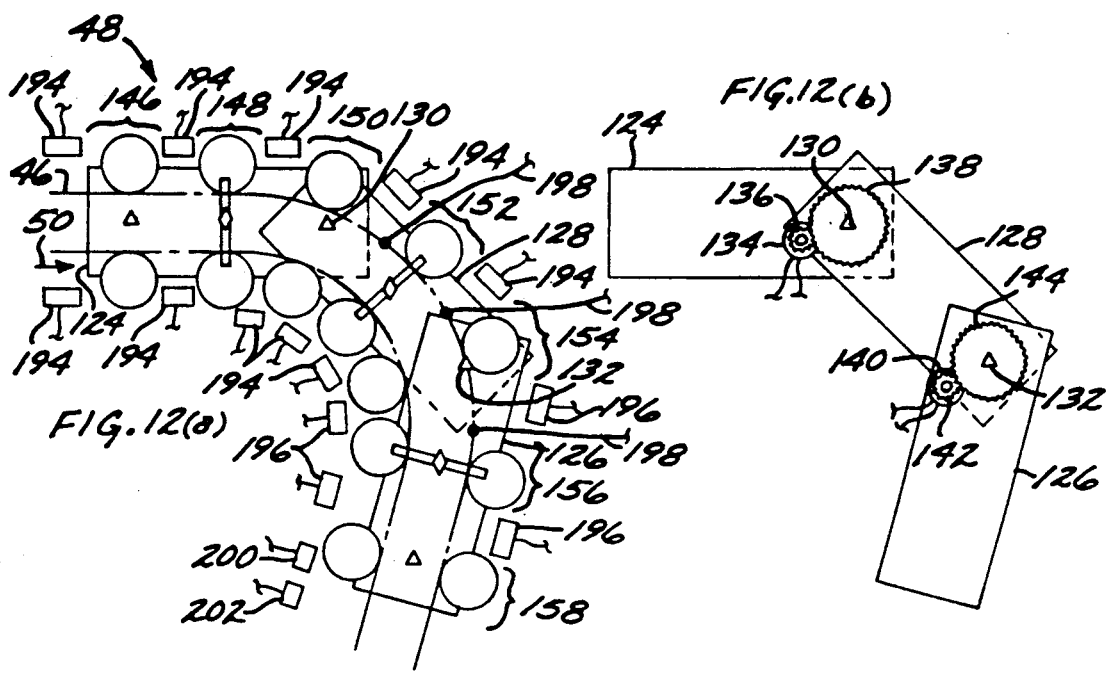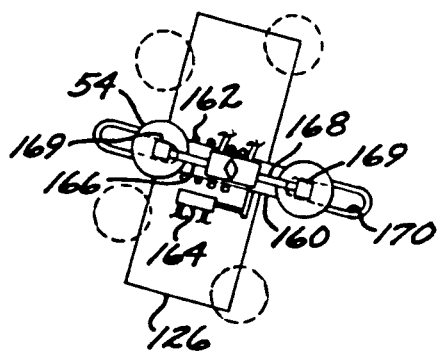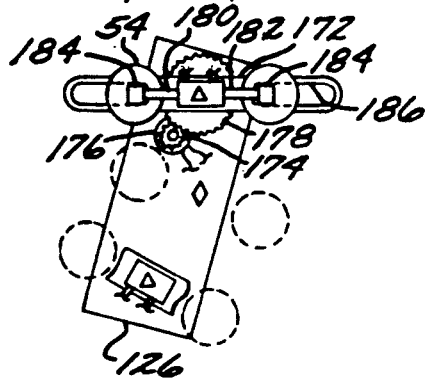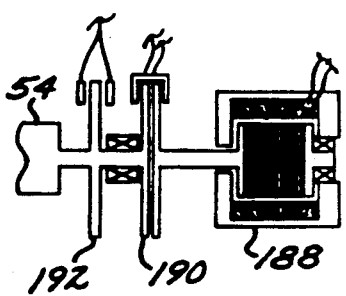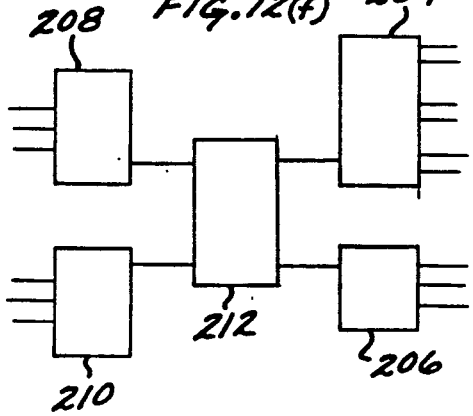

◎ DRIVE ROLLER
⊖ DRAG ROLLER

○ DRIVE ROLLER
⊖ DRAG ROLLER
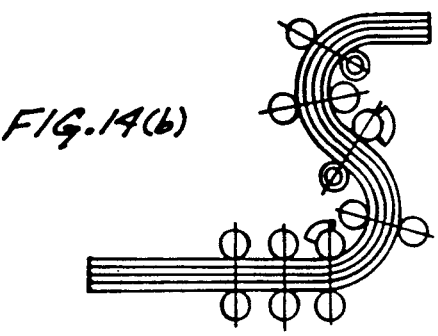
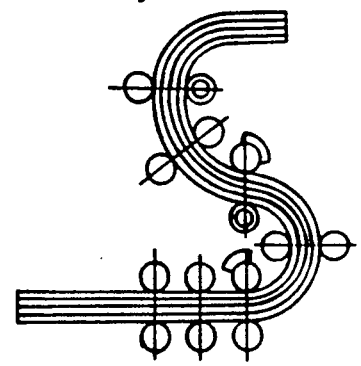
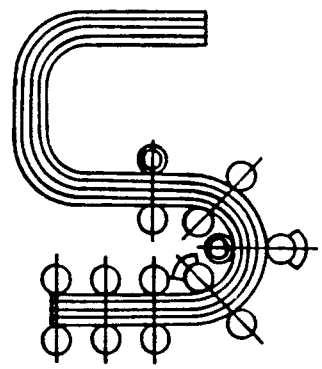
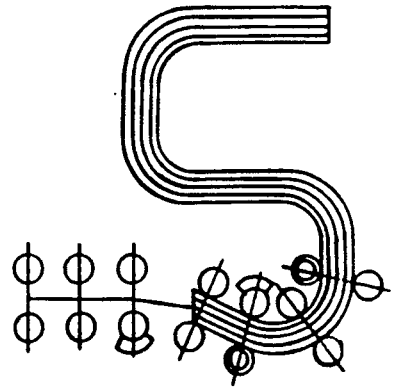
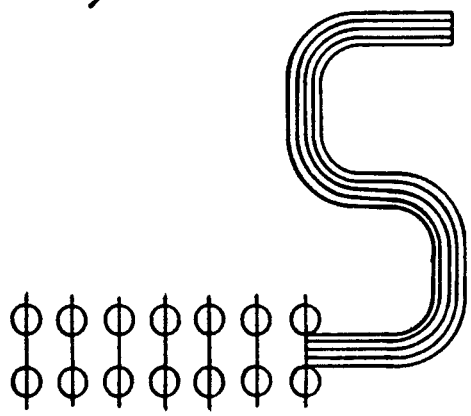
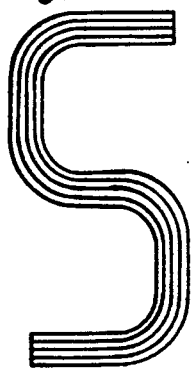

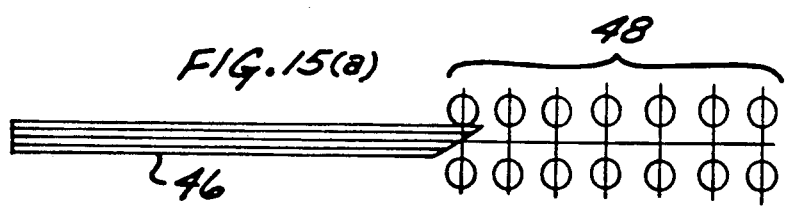
FIG.15(a)
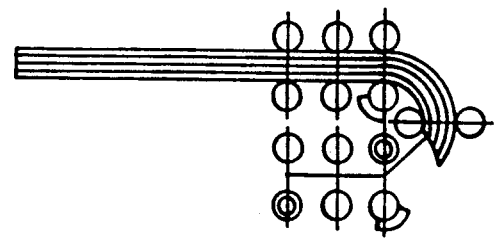
FIG.15(b)
○ DRIVE ROLLER
◐ DRAG ROLLER
FIG.15(c)
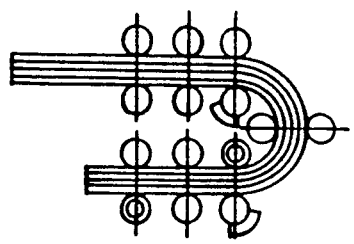
FIG.15(d)
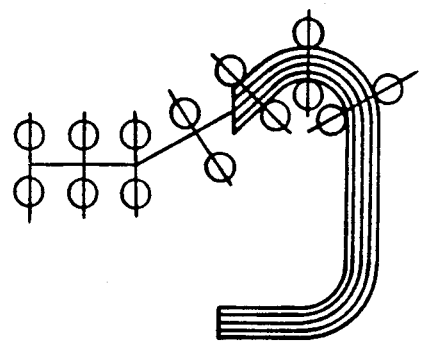
FIG.15(e)
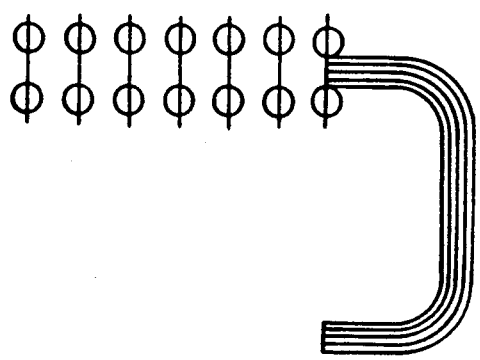
FIG.15(f)
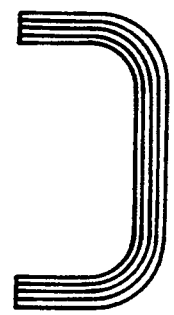

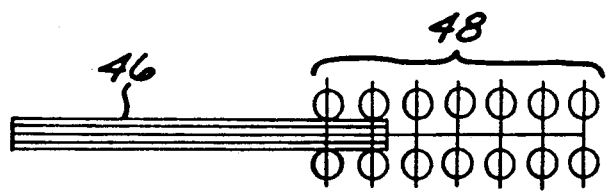
FIG. 16(a)
◎ DRIVE ROLLER
⊖ DRAG ROLLER
FIG. 16(c)
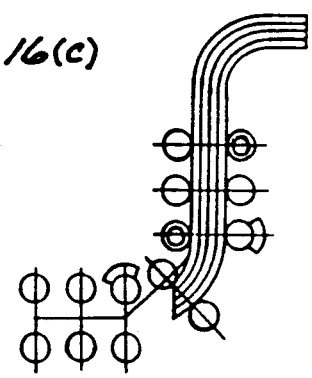
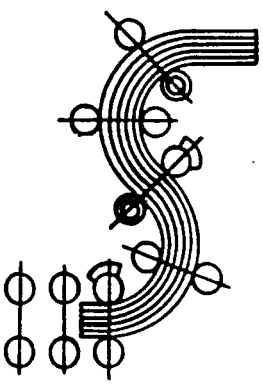
FIG. 16(b)
FIG. 16(e)
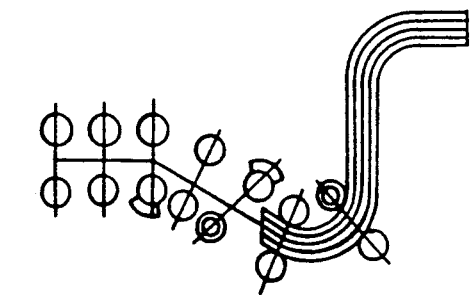
FIG. 16(d)
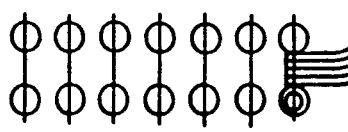
FIG. 16(f)
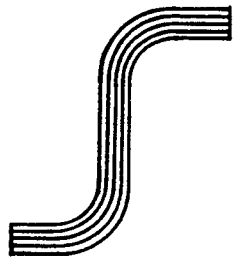

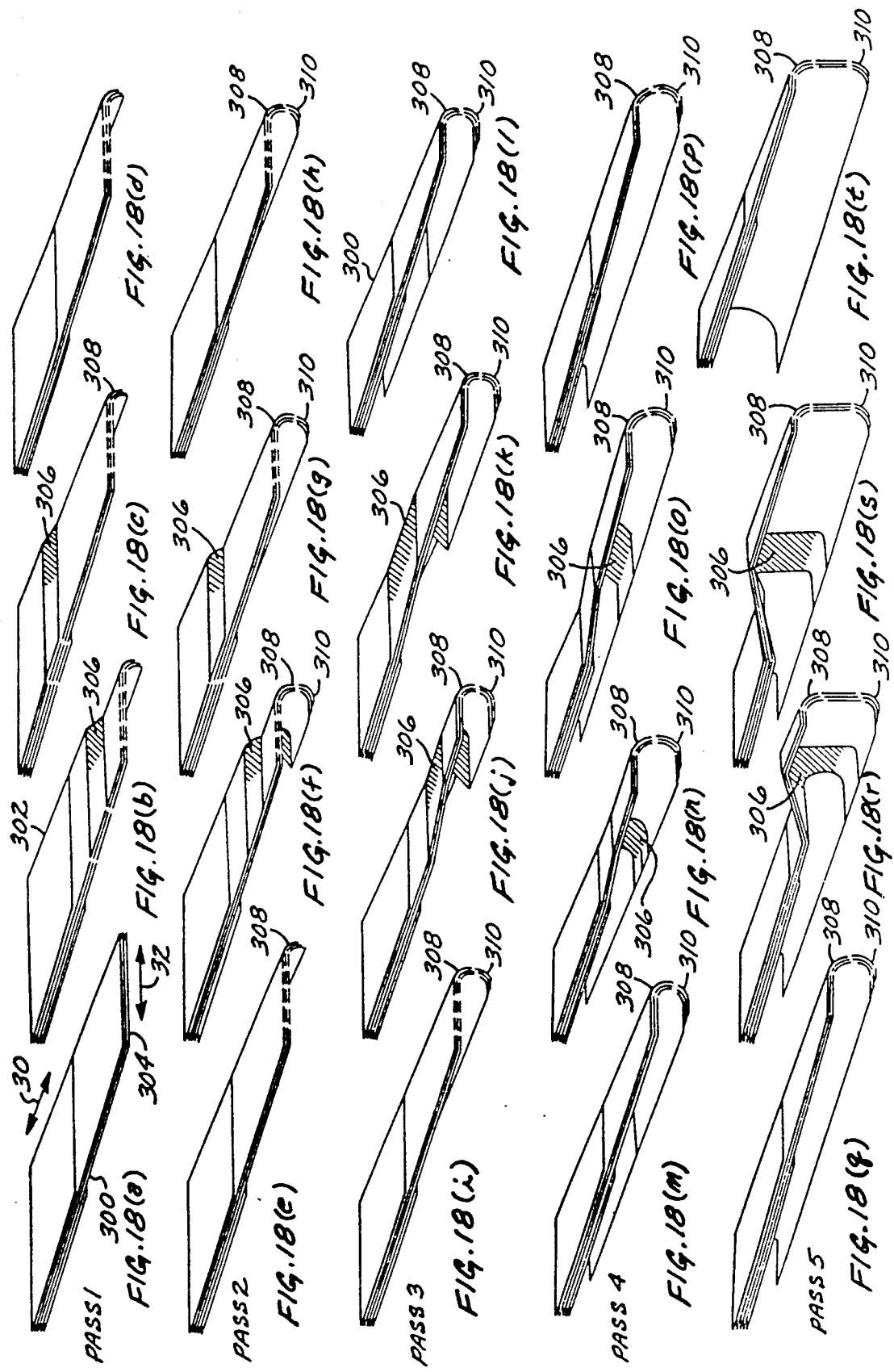

PROCESS FOR FORMING FIBER COMPOSITE MATERIALS

This application is a division of application Ser. No. 07/259,256, filed Oct. 18, 1988, now U.S. Pat. No. 4,955,803, for which priority is claimed, which is a continuation in part of application Ser. No. 825,337, filed Feb. 3, 1986, now U.S. Pat. No. 4,777,005.

BACKGROUND OF THE INVENTION

This invention relates to an apparatus and a process for deforming materials, and, more particularly, to an apparatus and a process for continuously and progressively forming composite material workpieces.

A composite material combines two or more other materials into a single integrated material structure, in a manner whereby the combined materials retain their original identities. One of the best known, commercially most important types of composites is the fiber composite material formed of long, substantially continuous high-strength fibers incorporated into a metallic or a polymeric matrix. These composites typically have large numbers of fibers embedded in the matrix. The fibers are usually selected to be strong, but are of low elongation to failure. Examples of the materials used as high-strength fibers include carbon, graphite, glass, Dupont Kevlar aramid, boron and silicon carbide. Composites with discontinuous fibers are made for some applications, but the best strength properties are obtained when the fibers are continuous, with aspect ratios of at least about 10.

The matrix holds the fibers in the proper orientation and protects them from external damage. The matrix may be a metal or nonmetal, such as a polymer. Polymeric matrix materials fall into two general classes, thermosetting and thermoplastic. Most thermosetting polymers are not readily formable by deformation processes. However, thermoplastic polymers can be plastically deformed, at sufficiently high temperatures, to a permanent change in shape without fracture.

The present invention relates to fiber composite materials having long fibers embedded in a plastically deformable matrix. Examples of such types of composites include metal and polymer matrix composites having long fibers. At the present time one of the most important types of such composites is prepared with carbon or glass fibers embedded in a matrix having a high temperature operating capability, such as polyetheretherketone (PEEK). The development of such fiber composite materials is continuing, with new combinations having improved properties emerging each year.

The fiber composite materials have exceptionally good strength and modulus properties with low weight, which makes them attractive in a variety of applications. Because the cost of such composites in the past has been high, their use has been limited to specialized applications such as certain aircraft and spacecraft components, golf clubs, tennis rackets and sailboat masts. Even though composite materials would offer significantly improved performance in many other applications, the high cost of preparing the basic material and then fabricating it into the final shape has inhibited widespread use of the material.

The most commonly used approach to making pieces of the composite material is to lay up tapes of fiber-containing matrix material into flat pieces, and then to consolidate the tapes by pressing the flat pieces in a large press. To achieve good strength and stiffness properties in the finished material, the fibers in the layers may be oriented in various directions within the plane of the workpiece. The consolidated laminate therefore consists of discrete layers. Within each layer there is an intimate mixture of fiber and matrix material, but between layers there is often some additional matrix material.

The press used to consolidate the strips can utilize flat platens to press the layers of composite material, to produce a flat plate of the composite material. Flat plates have limited uses, because most components are not flat, and instead contain curved sections. Shaped pieces of composite can be made by substituting curved fixed dies for the flat platens, so that the composite is consolidated to the desired final shape. Alternatively, pieces of the composite can be consolidated as flat plates, and then reshaped using fixed dies corresponding to the overall final shape of the component, in a separate die-forming operation. This approach is termed post forming.

The fabrication of composite structures using fixed dies has significant drawbacks and limitations, both from technical and economic standpoints. Forming in a press having dies for platens often results in gaps and voids in the structure, particularly between layers, because of the difficulties in achieving the proper uniform layup of the tapes prior to pressing and a uniform pressing pressure during die forming. The post-forming approach may produce high compressive stresses in the fibers in the concave-going side of bends, resulting in buckling and misalignment of the fibers and unsatisfactory mechanical properties.

Economic drawbacks to the use of the die-pressing approach are equally significant. If the piece of composite structure is large, the die must be large and the die press must also be large, resulting in high costs for the preparation of the die and high capital costs in presses and furnaces for heating the die during forming. If only a few parts are to be fabricated, the cost of making the die may be a large fraction of the total cost. Specialized dies may have lead times of months to prepare, requiring that they be designed and ordered long before the actual manufacturing is to occur. While the ordering of long-lead time dies is not an insurmountable obstacle, failure of a die after it is received or the need to change the die design do create significant problems. The science and art of composite materials has not progressed to the point that the structures and dies can be designed without trial and error in some cases. The long lead times for obtaining dies significantly inhibits the ability of engineers to change the designs of the composite structures for either structural or manufacturing reasons after the dies are received, so that optimization is difficult with the present manufacturing technology.

Accordingly, there exists a need for an improved approach to the manufacturing of composite material structures having bent or curved sections. Such an apparatus and process should allow the manufacture of structures having excellent properties, and in particular should avoid the formation of voids or misaligned fibers in the structure, problems inherent in the present techniques. The size of the forming apparatus would desirably be small, minimizing capital costs and allowing the forming of parts larger than the apparatus itself. A highly desirable feature would be a degree of adjustability so that many different shapes of structures could be formed with the one apparatus, increasing its versatility and eliminating the lead time normally spent in preparing new dies for each new part. The present invention fulfills this need, and further provides related advantages.

SUMMARY OF THE INVENTION

The present invention is embodied in an apparatus and process for forming a composite workpiece of continuous fibers in a deformable matrix, wherein composite plates may be formed into curved sections in the solid state without using fixed dies and without placing the fibers into the state of compression which can result in misaligned fibers and reduced mechanical performance of the composite. The invention uses a continuous, progressive die-less forming approach which allows the forming apparatus to be of a compact size that is smaller than the structure or part being formed. Forming costs for prototype and small-lot production are dramatically reduced, and optimizing adjustments to the shape of the structure are possible in subsequent parts or by reshaping of a previously formed part.

In accordance with the invention, a process for continuously and progressively forming a workpiece of a reinforced composite material comprises the steps of supplying a workpiece of a reinforced composite material having reinforcements embedded within a matrix; and bending the workpiece in a kinematically admissible manner such that the laminar length of the workpiece, in the direction of bending, remains substantially unchanged during the forming process.

In accordance with one embodiment of the invention disclosed and claimed in the parent application, now U.S. Pat. No. 4,777,005, apparatus for forming a composite workpiece of fibers in a deformable matrix which passes through the apparatus in a travel direction comprises a plurality of pairs of opposed rollers between which the workpiece passes, the plurality of pairs of opposed rollers defining in elevation a curved roll-line profile which determines the shape of the workpiece as it passes between the plurality of pairs of opposed rollers; a roller mounting assembly for holding and positioning the pairs of rollers, the assembly including means for selectively setting the roll-line profile to include a curved portion; roller drive means for selectively and individually controlling the turning of the rollers, including means to drive at least some of the rollers to move the workpiece forwardly and to retard the turning of at least some of the rollers as the workpiece passes through the apparatus; and controller means for controlling the roller mounting assembly to define the roll-line profile and for controlling the roller drive means to maintain the fiber alignment of the fibers in the composite workpiece at all stations of the roll-line profile.

In a preferred embodiment of the previously described approach, the pairs of rollers are divided into three overlapping sections of the roller mounting assembly. Each of the three sections is capable of imposing a different radius of curvature on the workpiece as it passes through the rollers. At any instant, one section of rollers, the forming section rollers, imposes a radius of curvature equal to the desired curvature of that location on the workpiece which is just exiting the apparatus. Another section of rollers, the holding section rollers, are controlled to follow and match the radius of curvature of that location on the workpiece which is just entering the apparatus; this section holds the workpiece in place and prevents it from rotating while the other sections form the workpiece. The central section of rollers, the laminar length adjusting section rollers, lies between the other two sections and imposes a radius of curvature on the workpiece which exactly compensates for any changes in laminar length at any location through the thickness dimension of the workpiece caused by the actions of the other two sections, thereby avoiding detrimental tensile or compressive stresses in the continuous fibers as the workpiece is formed. In a most preferred embodiment, each section of rollers comprises three pairs, but two of the pairs are shared by two sections each, so that there is a total of seven pairs of rollers.

Heating and cooling means for selectively heating only the portion of the workpiece lying within the apparatus is provided, if it is necessary to heat the matrix of the composite to a temperature at which it can flow plastically and be formed. The matrix material outside of the apparatus does not flow plastically and retains its shape. In forming a composite workpiece, the roller mounting assembly is preferably configured so that the pairs of rollers cooperate to continuously introduce adjacent bends of appropriate magnitudes and senses into the workpiece so that no detrimentally large tensile or compressive stresses are imposed on the fibers during the forming process, this being accomplished by ensuring that the laminar length of the workpiece remains substantially unchanged during the forming operation.

More specifically, and as previously described in the parent application Ser. No. 825,337, now U.S. Pat. No. 4,777,005, apparatus for forming a composite workpiece of fibers in a deformable matrix which passes through the apparatus in a travel direction comprises seven pairs of opposed rollers between which the workpiece passes, the seven pairs of opposed rollers defining in elevation a curved roll-line profile which determines the shape of the workpiece as it passes between the seven pairs of opposed rollers; a roller mounting assembly for holding and positioning the seven pairs of rollers, the roller mounting assembly comprising three sections of three pairs of rollers each, the three sections overlapping so that two pairs of rollers are shared by two sections each, the assembly including means for selectively setting the roll-line profile to include a curved portion; roller drive means for selectively and individually controlling the turning of the rollers, including means to drive at least some of the rollers to move the workpiece forwardly and to retard the turning of at least some of the rollers as the workpiece passes through the apparatus; heating and cooling means for selectively heating only the portion of the workpiece lying within the apparatus; and controller means for controlling the roller mounting assembly to define the roll-line profile, for controlling the roller drive means to maintain the fiber alignment of the fibers in the composite workpiece at all stations of the roll-line profile, and for controlling the heating means.

In another aspect of the invention related to a basic element of the approach described in the parent application Ser. No. 825,337, now U.S. Pat. No. 4,777,005, apparatus for progressive forming of a workpiece of a fiber-containing composite material passing therethrough, comprises means for deforming the piece of composite material, including three longitudinally adjacent sections, two of the adjacent sections having means for changing the curvature of the workpiece within that section to a desired curvature, and one of the sections having means for preventing rigid body rotation of the workpiece, wherein the centerplane through adjacent sections share a common tangent where they overlap; means for moving the workpiece through the apparatus; and means for retarding the motion of the workpiece through the apparatus at one or more selected points, whereby compressive stresses otherwise induced in the fibers during the deforming operation are reduced below the buckling stress of the fibers in the piece of composite material so that the fibers remain aligned as the piece of composite material passes through the means for deforming. Preferably, there is provided a heating and cooling means for selectively heating and cooling the composite material within the means for deforming.

In accordance with the processing aspect of the invention as described in the parent application Ser. No. 825,337, now U.S. Pat. No. 4,777,005, a process for continuously deforming a piece of a fiber-containing composite material comprises the steps of passing the piece of composite material in a travel direction through apparatus which bends the composite material to change its curvature, whereby at least some of the fibers are subjected to compressive stress as the bending occurs, the compressive stress tending to buckle and misalign the fibers; and locally retarding the motion in the travel direction of the piece of composite material, whereby the retarding force induces tensile stresses to counteract the compressive stresses, so that the stress on the fibers is reduced below the buckling stress to retain alignment of the fibers. More generally stated, a process for bending a piece of fiber-containing composite material comprises the steps of bending the piece by applying forces thereto, the bending forces having the effect of creating compressive stress in the fibers of the composite material on the concave-going side of the composite piece that tend to cause the fibers to become misaligned; and applying shear forces to the surface of the piece of composite material simultaneously with the application of the bending forces, the shear forces acting to nullify the compressive stress produced by the bending forces on the concave side of the composite piece, whereby the fibers in the composite remain aligned during the bending operation.

In another aspect as described in the parent application Ser. No. 825,337, now U.S. Pat. No. 4,777,005, a process for continuously and progressively forming a workpiece of a fiber-containing composite material having a deformable matrix, comprises the steps of passing the workpiece in a travel direction through apparatus having bending elements extending along the travel direction, the elements bending and unbending the composite material such that the laminar length of the composite workpiece remains substantially unchanged during the forming process. This constraint condition is accomplished by continuously adjusting the bending elements so that any changes in laminar length caused by any of the bending elements as the workpiece is formed are appropriately compensated by the actions of other of the bending elements. The bending elements of the apparatus are preferably pairs of rollers or groups of pairs of rollers between which the piece of composite material passes during deformation. In this latter embodiment, the rotation of at least some of the rollers may be retarded to induce tensile forces in the workpiece, thereby serving to prevent misalignment of the fibers in the composite material as it is bent. The workpiece is preferably locally heated while it is within the apparatus to a temperature sufficiently high that the matrix can flow freely to permit shear of the interlaminar matrix material during the bending operation. The matrix may even be heated above the melting point, because the heating is local and the composite material workpiece is held rigid in the forming apparatus.

In yet another aspect, a process for forming a composite workpiece to a selected shape which contains a net bending, without fracturing or buckling the fibers, comprises introducing the net bend to be contained within the workpiece at the leading edge of the workpiece; and propagating the net bend through the workpiece by the progressive unbending and bending of subsequent sections of the workpiece, selected portions of the net bending being permanently left at appropriate locations on the workpiece to form the desired shape.

In yet a further aspect, a process for forming a composite workpiece containing fibers to a final shape not containing any net bending, without fracturing or buckling the fibers, comprises introducing equal and opposite bends into the interior regions of the workpiece, and propagating these bends through the workpiece as the workpiece moves through the apparatus by the progressive unbending and bending of subsequent sections of the workpiece, depositing selected portions of the bends at appropriate locations on the workpiece to form the desired shape. A combination of the previously described two processes can be used to form a workpiece which contains both net bending and equal and opposite bends.

The apparatus described in the parent application Ser. No. 825,337, now U.S. Pat. No. 4,777,005, is preferably embodied in a multisection machine containing three sections of rollers, with the centerplanes defined by each section of rollers imposing appropriate curvature on the composite material as it passes through the section, the curvature in each section being continuously controlled so as to form the composite material to its final shape while avoiding imposition of detrimental tensile or shear stresses on the fibers. The workpiece is pulled forward by driving some of the leading rollers in a forward direction. As the workpiece bends, some of the fibers in the workpiece are placed into compressive loading, which tends to buckle, warp and misalign the fibers and wrinkle the surface of the workpiece, impairing its mechanical properties. Retarding the motion of some of the trailing rollers, particularly those toward which the bend is being made, induces a dragging shear force on the surface of the workpiece, which produces a tensile stress within the interior of the workpiece. The tensile stress counteracts the bending-induced compressive stresses, so that the fibers can be placed into a state of tension, or at least a sufficiently reduced state of compression, so that buckling and misalignment does not occur. Some of the rollers are allowed to freewheel, applying neither a driving nor a dragging force, and these rollers act primarily to provide the perpendicular bending force which shapes the workpiece. Although the forming apparatus can use deformation elements other than rollers, rollers are preferred because they can transmit the necessary forces by rolling contact without marring the surface of the workpiece.

The composite material may be heated as it passes through the successive pairs of rollers. The major part of the bending is desirably accomplished at a hot temperature, sufficiently high that the matrix material can readily shear to accommodate the imposed bending. Normally, the maximum temperature is below the melting point of the matrix, but in some instances the matrix may be melted locally in the deformation region. Cooling of the composite from this hot temperature can bring the composite through a controlled warm zone, which allows some degree of shear and therefore bending but allows the matrix to be closer to the cold temperature which it must have when it leaves the apparatus. Cooling of the composite can also be achieved in a controlled manner to determine those final properties of the matrix which may be sensitive to the cooling rate.

The approach of the present invention is particularly useful in introducing transverse bends into a workpiece moved longitudinally in the travel direction through the forming apparatus. This permits long pieces such as thin beams to be bent in the transverse direction. In accordance with this aspect of the invention, a process for continuously and progressively forming a workpiece of a reinforced composite material comprises the steps of supplying a workpiece of a reinforced composite material having reinforcements embedded within a matrix; and passing the workpiece in a longitudinal direction through apparatus having transverse bending elements extending transverse to the longitudinal direction, the elements permanently bending the composite material to change its curvature in the transverse direction by propagating a bending deformation progressively through the workpiece in successive passes of the workpiece through the bending elements, the propagating being accomplished such that the laminar length of the workpiece, in the transverse direction, remains substantially unchanged during the forming process.

More specifically, a process for continuously and progressively forming transverse bends in a workpiece of a fiber-containing composite material comprises the steps of supplying a workpiece of a fiber-containing composite material having fibers embedded within a matrix, the workpiece having a longitudinal direction and a transverse direction defined therefor; and passing the workpiece in the longitudinal direction through apparatus having transverse bending elments extending in the transverse direction, the elements permanently bending the composite material to change its curvature in the transverse direction by introducing a net bending deformation into a transverse edge of the workpiece, and progressively propagating the introduced net bending deformation transversely through the workpiece in successive passes of the workpiece through the bending elements, the propagating being accomplished such that the transverse laminar length of the workpiece remains substantially unchanged during the forming process.

Apparatus for bending a composite in the transverse direction is also provided. An apparatus for introducing and propagating bends in a composite material workpiece having a longitudinal direction and a transverse direction defined therefor comprises deformation means for deforming the workpiece in the transverse direction, as the work piece is moved in the longitudinal direction, the deformation means including a pair of opposing compound disk rollers each rotatably mounted on an axle lying parallel to the longitudinal direction, and spaced apart so that the workpiece passes between the compound rollers and in contact therewith, a first single compound disk roller rotatably mounted on an axle lying parallel to the longitudinal direction, the compound disk rollers permitting the workpiece to roll thereover in both the longitudinal direction and the transverse direction; means for moving the workpiece between the pair of opposing compound rollers, both in the longitudinal direction and in the transverse direction; and means for moving the axle of the first single compound disk roller in a circular arc whose center is at the axis of rotation of a first one of the pair of opposing compound disk rollers and whose radius is equal to the sum of the radius of the first one of the pair of opposing compound disk rollers plus the radius of the first single compound disk roller plus the thickness of the composite material workpiece.

The first single compound disk roller permits the introduction of a transverse bend of one sense, as for example a concave upwardly bend, as the workpiece moves in the longitudinal or travel direction. A transverse bend of the opposite sense, as for example a concave downwardly bend, is produced using a second single compound disk roller. The second single compound disk roller is rotatable mounted on an axle lying parallel to the longitudinal direction, the second single compound disk roller permitting the workpiece to roll thereover in both the longitudinal and the transverse directions. There is a means for moving the axle of the second single compound disk roller in a circular arc whose center is at the axis of rotation of the first single compound disk roller and whose radius is equal to the sum of the radius of the first single compound plus the radius of the second single compound disk roller plus the thickness of the composite material workpiece.

More generally, an apparatus for introducing and propagating bends in a composite material workpiece having a longitudinal direction and a transverse direction perpendicular to the longitudinal direction defined therefore comprises deformation means for deforming the workpiece in the transverse direction, as the workpiece is moved in the longitudinal direction, the deformation means including a pair of opposing support elements spaced apart so that the workpiece passes between the support elements and in contact therewith; a single support element mounted to apply pressure to a face of the workpiece at a location transversely displaced from a line connecting the pair of opposing support elements, the support elements permitting the workpiece to move thereover in both the longitudinal and transverse directions; means for moving the workpiece between the pair of opposing support rollers, in both the longitudinal and transverse directions; and means for moving the single support element relative to the pair of opposing support elements. As before, this arrangement permits the introduction of a transverse bend of one sense. A second single support element and means for moving it permit introduction of curvature of the opposite sense.

An important advantage of the approach is that deformation can typically be accomplished at relatively low temperatures, and in a time that is brief as compared with closed die forming, so that the structure of the matrix is not significantly altered during the forming operation. More specifically, for composites with a matrix of semicrystalline thermoplastic material, the degree of crystallinity in the matrix is not altered because the forming operations take place below the melting temperature. This is a distinct advantage because in such polymers, including polyetheretherketone, the mechanical properties and environmental resistance depend upon the degree of crystallinity which, in turn, is altered if the polymer is melted. For those materials requiring high temperature processing, even above the melting point of the matrix, the apparatus permits such processing.

An array of sensors can be provided to monitor the shape and temperature of the composite during and after deformation, as well as the degree of fiber misalignment. The forming apparatus and process are preferably under computer control, so that the results of the monitoring procedures can be fed back into the forming operation. If a particular forming operation is not fully successful, in many cases the composite structure can be run through the apparatus again, with the parameters varied to achieve the desired results. Moreover, an interactive design and manufacturing data base can be built up for particular structures and material combinations, enabling subsequent modifications to the forming process based upon experience gained with prior forming operations, thereby minimizing the number of passes or trials requered to form the desired structure.

As will now be appreciated, the present invention provides an important advance in the art of fabrication and forming of composite materials. The properties of fabricated composite structures can be improved by reducing fiber misalignment and controlling the properties of the matrix. The forming operation itself is made much easier, particularly for small lots and complex parts, by forming the structures with rollers and without the need for fabricating specialized dies that are useful only for a single shape and operation. The apparatus is compact, and can form workpieces much larger than itself because the deformation is introduced as the workpiece moves through the apparatus. The controllable progressive forming operation allows the gathering and quantification of forming information which can be used in designing the forming sequences for other structure, so that a body of forming knowledge can be assembled. Other features and advantages of the present invention will become apparent from the following more detailed description, taken in conjuction with the accompanying drawings, which illustrate, by way of example, the principles of the invention.

BRIEF DESCRIPTION OF THE DRAWINGS

FIGS. 4A and 4B are a side elevational view of a composite material being bent with, FIG. 4A, two deformation sections, and, FIG. 4B, three deformation sections;

FIG. 5 is a schematic side elevational view of a preferred apparatus for progressively forming a composite workpiece to have longitudinal curvature;

FIG. 6 is a side elevational view of another approach for deforming a composite workpiece while maintaining constant laminar length;

FIGS. 7A and 7B are a side elevational view of a piece of composite material in three-point bending, showing the stress state with and without the application of shear force on the concave side of the bend;

FIG. 8 is a side elevational view of a piece of composite material being continuously and progressively bent in the apparatus of FIG. 3, with drive forces being applied to move the workpiece forward and drag forces being applied through selected active rollers;

FIG. 9 is a schematic side elevational view of a composite workpiece being bent with application of localized heating to control the structure and formability of the matrix;

FIG. 10 is a schematic side elevational view of a composite undergoing progressive forming to two 45 degree bends, with the application of localized heating, showing in multiple parts the progression of the deformation;

FIGS. 12(a), 12(b), 12(c), 12(d), 12(e) and 12(f) are a series of views of an apparatus for accomplishing progressive roll forming of a composite workpiece, with some portions illustrated in section;

FIGS. 14(a), 14(b), 14(c), 14(d), 14(e), 14(f) and 14(g) are a schematic side elevational view of a composite workpiece undergoing progressive forming to a multiple reverse bend, with the application of localized heating, showing in multiple parts the progression of the deformation and the positioning of the roller pairs;

FIGS. 15(a), 15(b), 15(c), 15(d), 15(e) and 15(f) are a schematic side elevational view of a composite workpiece undergoing progressive forming to a U shape, with the application of localized heating, showing in multiple parts the progression of the deformation and the positioning of the roller pairs;

FIGS. 16(a), 16(b), 16(c), 16(d), 16(e) and 16(f) are a schematic side elevational view of a composite workpiece undergoing progressive forming to a simple reverse bend, with the application of localized heating, showing in multiple parts the progression of the deformation and the positioning of the roller pairs;

FIGS. 18(a), 18(b), 18(c), 18(d), 18(e), 18(f), 18(g), 18(h), 18(i), 18(j), 18(k), 18(l), 18(m), 18(n), 18(o), 18(p), 18(q), 18(r), 18(s) and 18(t) are a multipart perspective view of the progressive deformation of a panel to produce a tapered component having a C-channel shape at one end and an arch shape at the other end;

DETAILED DESCRIPTION OF THE PREFERRED EMBODIMENTS

The present invention deals with the forming of composite materials having relatively nondeformable fibers embedded in a deformable plastic or metal matrix. Such matrix materials often do not flow plastically at ambient temperatures but flow more readily at elevated temperatures. Such fiber-containing composite materials are difficult to form into components having curved or bent portions because it is difficult to avoid fracturing or misaligning the fibers during the forming process.

Figure 1:
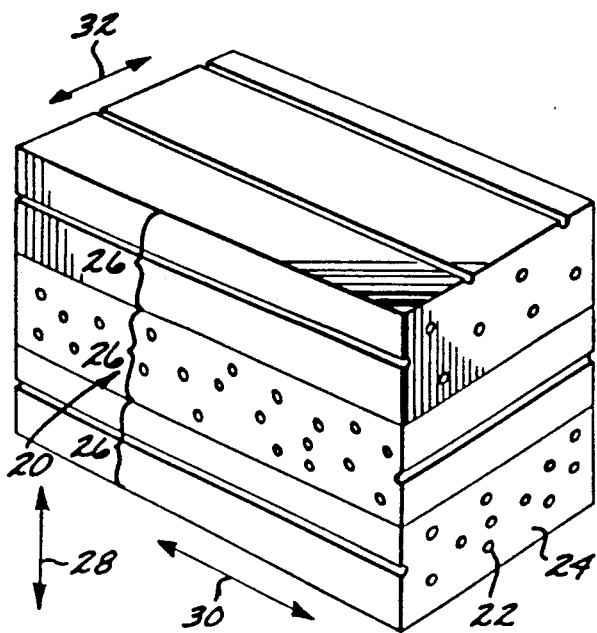
FIG. 1 is a schematic perspective view of a fiber-containing composite material having multiple layers.
Figure 17A:
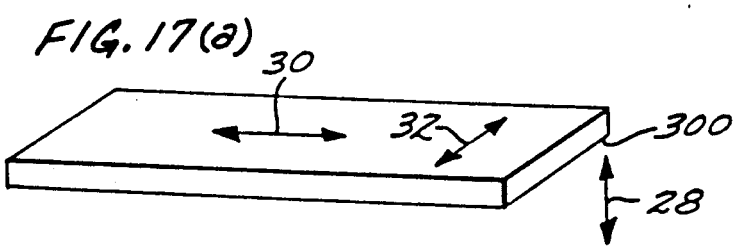
FIGS. 17(a), 17(b), 17(c) and 17(d) are a schematic perspective view of the different classes of bent panels that may be prepared using transverse bending deformation.

FIG. 1 illustrates a fiber-containing composite 20 having fibers 22 lying in a matrix 24. The composite 20 is illustrated as having three layers 26 or plies, the fibers 22 lying in the plane of the layers. In most applications there will be many layers or plies with different fiber orientations in various layers. Within each layer 26, the fibers 22 lie generally parallel to each other. In many applications, composite materials are utilized as a workpiece 300 having one relatively thin dimension, as further illustrated in FIG. 17(a), and the panel must be curved or bent in the through-thickness direction 28, either with a longitudinal or a transverse bend.

Figure 17B:
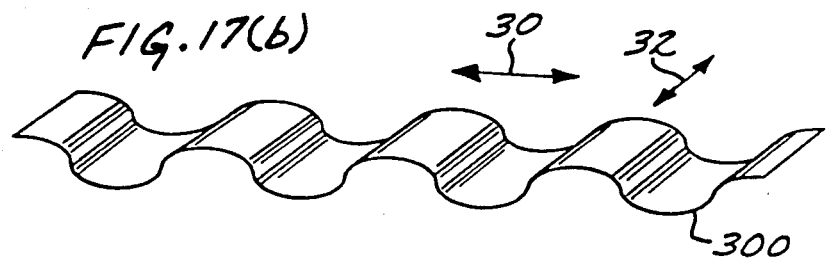

There are several cases for bending of the workpiece 300. In one case, illustrated in FIG. 17(b), the panel is singly curved and long in the curved direction. During these bending operations, one direction in the plane of the panel, designated the longitudinal direction 30, is bent into a curved profile, while the perpendicular direction in the plane of the panel, designated the transverse direction 32, stays straight. The preparation of singly curved, long in the longitudinal direction panels is discussed in the following section in relation to FIGS. 2-16.

Figure 17C:
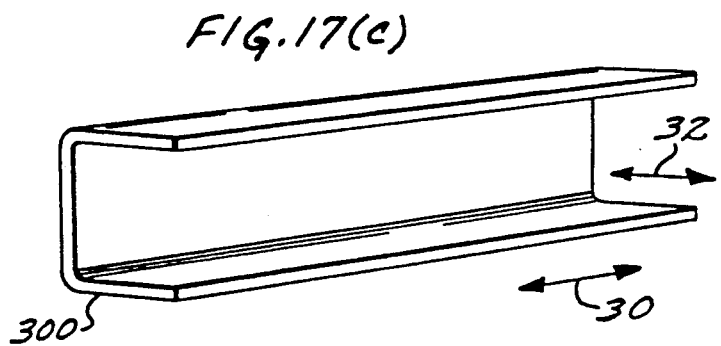
Figure 17D:
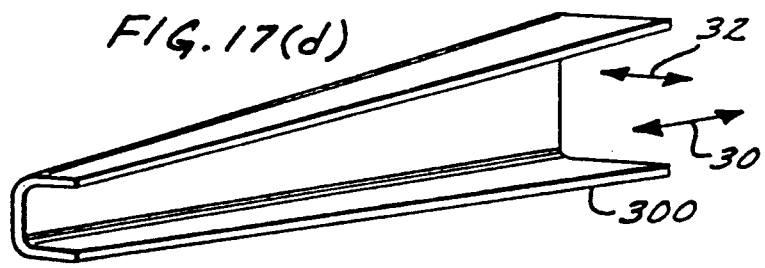

In another case, the panel is singly curved and long in the straight direction, with either a constant cross section, FIG. 17(c), or a variable cross section, FIG. 17(d). During these bending operations, the longitudinal direction 30 remains straight and the transverse direction 32 is bent into a curved profile. The fabrication of singly curved, long in the straight direction panels is discussed in a later section in relation to FIGS. 18-23.

In a typical forming situation, the composite 20 must be bent to form a curved panel. One of the most demanding bending operations, which is frequently encountered in practice, requires that the composite be bent with some fibers lying totally or partially in the workpiece direction which is to become a curve. FIG. 2 depicts such a bending operation. To illustrate the problem arising during this bending process, the composite 20 has been divided into a series of laminae 34, which may, but need not, correspond to the layers 26 of the composite 20. In elevation, the laminae 34 are strips lying parallel to the fibers 22 and the longitudinal direction 30 for longitudinal bending (or strips lying parallel to the fibers 22a and the transverse direction 32, for transverse bending), at increasing spacings from an inner surface 36 of the composite 20. The end-to-end length of the composite 20 within a selected lamina 34 is termed the laminar length. As illustrated for a flat plate of composite material 20 in FIG. 2(a), an inner laminar length 38 of the lamina 34 lying adjacent the inner surface 36 is the same as an outer laminar length 40 of the lamina lying furthest from the inner surface 36.

Figure 2A:
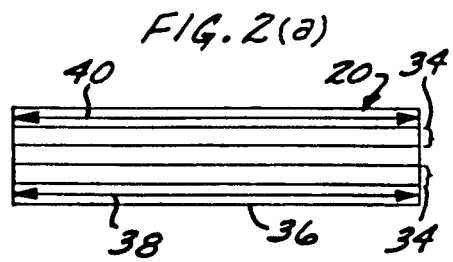
FIGS. 2(a), 2(b), 2(c) and 2(d) are a series of schematic side elevational views of 2(a) a flat composite plate, 2(b) a composite plate bent into a curve by conventional die forming, illustrating the varying laminar lengths through the section, 2(c) the plate of FIG. 2(b), showing the effect on the fibers, and 2(d) a composite plate bent into a curve by the present progressive forming approach, with substantially constant laminar lengths through the section.
Figure 2B:
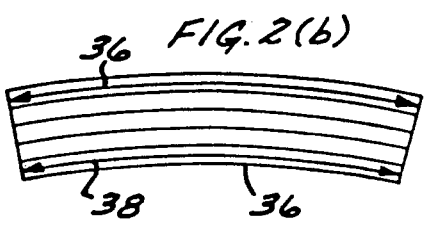
Figure 2C:

When a plate of composite material is bent as illustrated in FIG. 2(b), a neutral axis of the plate remains unchanged in length, while there is a natural tendency for the inner laminar length 38 to decrease and the outer laminar length 40 to increase. If the piece being bent is a conventional ductile metal not having continuous fibers, the lengthening of the outer laminate and the shortening of the inner laminate do not pose a significant problem, since the ductile metal deforms to accommodate these length changes. Because the composite material 20 contains relatively inextensible fibers 22 lying parallel to the laminar lengths, such ductile deformation of the entire composite 20 cannot occur. Instead, during bending the fibers lying furthest from the inner surface 36 are placed into tension, while the fibers lying nearest to the inner surface 36 are placed into compression. In a severe bending operation, the tensile stresses may be sufficiently high to fracture the fibers 42 lying furthest from the inner surface 36, and the compressive stresses may be sufficiently high to buckle the long, thin fibers 44 lying near to the inner surface 36, so that these fibers become misaligned and the inner surface 36 becomes wrinkled, as illustrated in FIG. 2(c). A conventional forming operation using fixed dies causes such loadings in the fibers, because of the surface constraints placed onto the composite material 20 by the dies.

Figure 2D:

A more desirable situation is illustrated in FIG. 2(d), wherein the laminae are allowed to shear past each other during the bending operation, so that the inner laminar length 38 and the outer laminar length 40 remain constant and equal to their length in the flat plate illustrated in FIG. 2(a). The types of problems illustrated in FIG. 2(c) are thereby avoided. No process or apparatus for implementing this approach has been known.

Figures 3A, 3B, 3C, 3D:
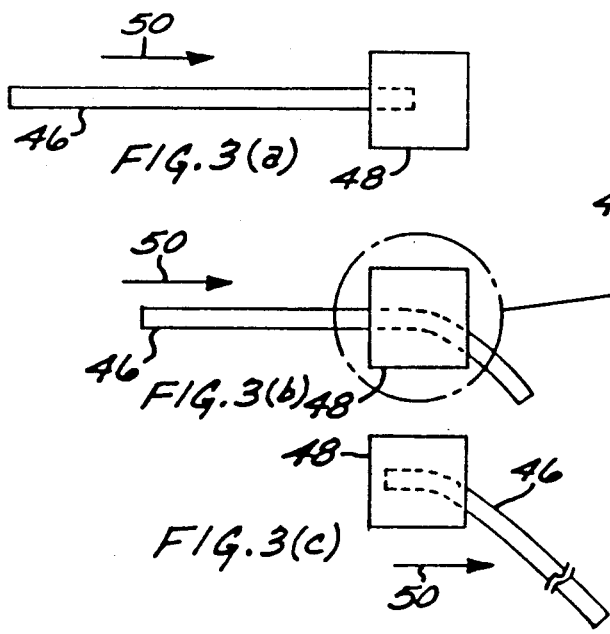
FIGS. 3(a), 3(b), 3(c) and 3(d) are a side elevational view of an apparatus for forming fiber-containing composite materials.

In accordance with the present invention, a workpiece 46 of a fiber-containing composite material can be bent to contain a curved section by a continuous, progressive forming operation as the workpiece 46 passes through a forming apparatus 48 in a travel direction 50, illustrated in FIG. 3. The workpiece 46 enters the apparatus 48 in FIG. 3(a), is in an intermediate state of forming in FIG. 3(b), and leaves the apparatus 48 in FIG. 3(c). The inset to FIG. 3(b) depicts the apparatus 48 in greater detail. Forming is accomplished by passing the workpiece 46 between a plurality of pairs 52 of opposed rollers 54. The opposing members of each pair of rollers 54 are spaced apart a sufficient distance so that the workpiece 46 passes between each of the rollers 54. In the elevational view of FIG. 3, the succession of spaces between each of the two opposed rollers 54 of each pair 52 defines the path followed by the workpiece 46 as it passes through the apparatus 48, which path is termed the roll-line profile. The pairs of rollers 54 are moved in a manner which permits the apparatus 48 to form the workpiece so that the workpiece has a final desired shape after it has passed through the apparatus 48, while at the same time allowing and causing the laminae of the composite workpiece to shear over each other in the manner of FIG. 2(d), so that the fibers 22 are neither fractured nor buckled.

The workpiece 46 is pulled or driven forwardly in the travel direction 50 by turning the rollers 54 in the proper rotation. In the view of FIG. 3, this rotation is clockwise for the rollers 54 lying below the workpiece 40 and counter-clockwise for the rollers 54 lying above the workpiece 46. Only some of the rollers 54 are powered to drive the workpiece 46 forwardly, while others are retarded in their rotation to apply rearward surface tractions to the workpiece 46, thereby applying shear forces to the workpiece 46. Others of the rollers are allowed to freewheel, or turn in contact with the workpiece 46 while neither being driven forwardly nor retarded. The freewheeling rollers cooperate with other rollers 54 to apply normal and bending forces to the workpiece 46.

The workpiece 46 can also be heated while it is within the apparatus 48. A hot zone 56 is heated to a forming temperature that is sufficiently high that the matrix can flow freely to permit interlaminar shear of the type depicted in FIG. 2(d). Such forming temperature is normally below the melting point of the matrix, but may be higher in well-controlled situations. Warm zones 58 and 60 are found on either side of the hot zone 56, and cool zones 62 and 64 are found yet further from the hot zone 56. As the workpiece 46 passes through the apparatus 48, it is progressively heated to the forming temperature, formed and cooled. The matrix material of that portion of the workpiece 46 within the apparatus 48 can flow plastically and be formed, while the matrix material of that portion of the workpiece 46 outside of the apparatus 48 is cold enough to be rigid and not change its shape inadvertently due to gravitational, inertial, or other forces. This feature provides one of the major advantages of the approach, since the forming apparatus 48 can be much smaller than the workpiece 46 being formed, yet still progressively form the desired final shape.

The forming of the workpiece 46 within the apparatus 48 can be accomplished by any type of forming element, but the approach of using pairs 52 of rollers 54 has been found particularly suitable. The rollers 54 can apply the necessary forces to the surface of the workpiece 46, while not marring or scratching its surface. The pairs 52 of rollers 54 can also be positioned in many types of arrangements to accomplish the desired modes of deformation, provided that the laminar length within the forming apparatus is properly constrained by the positioning of the rollers during the forming operation.

It is preferred that the workpiece 46 be deformed within the apparatus 48 in three sections, and that the apparatus 48 use three functioning sections, for the reasons illustrated in FIGS. 4A and 4B. A workpiece 46 may have a preexisting curvature as it enters the apparatus 48, and is to have a different curvature as it leaves the apparatus 48. A holding section 66 should effectively grasp the incoming portion of the workpiece 46 to prevent it from rotating in space as it is formed. The possible preexisting curvature requires that the holding section 66 be adjustable to conform to that curvature. Adjustability of the holding section 66 also allows the apparatus to be reversed, whereupon the holding section 66 would perform a forming function. A forming section 68 should define the shape of the workpiece 46 as it leaves the apparatus 48. To maintain the laminar lengths of the workpiece 46 constant as the shaping in the forming section 68 occurs, there should be a laminar length adjusting section 70 which imposes appropriate curvature to the workpiece 46 to counteract the changes in laminar length otherwise introduced into the workpiece 46 by the other sections 66 and 68, acting simultaneously with the sections 66 and 68. Under some limited, special circumstances, it may be possible to implement the functions of preventing rotation and introducing the appropriate curvature using only two sections of deformation, as in FIG. 4A. However, the apparatus of FIG. 4A, having only the two sections that perform a deformation function, would not be able to grasp and hold the incoming workpiece to prevent it froim rotating. In the more general case illustrated in FIG. 4B, three sections are needed, to allow the apparatus 48 to grasp and hold the incoming workpiece, impose an arbitrary curvature on the outgoing workpiece, and also deform the workpiece to meet the laminar length constraint condition.

FIG. 5 schematically depicts the preferred apparatus for accomplishing the above described sequence. Seven pairs 52 of rollers 54 are organized into three sections of roller pairs 72, 74 and 76. Section 72 is termed the holding section, section 76 the laminar length adjusting section, and section 74 the forming section. Each section contains three roller pairs 52, two pairs being shared by the two sections which border it. This design allows the tangent to the workpiece 46 as it leaves one section to coincide with the tangent to the workpiece 46 as it enters the adjacent section, avoiding undesirable bending of the workpiece between sections. Within each section, the center roller pair of that section can be offset relative to the other two roller pairs of that section, thereby causing the roll-line profile within that section to have a specific radius of curvature defined by the positions of the three pairs of rollers. As will be described, there are two adjacent sections which deform the workpiece 46, so that the radius of curvature of the roll-line profile can be independently controlled at two adjacent locations.

After the workpiece has left the apparatus 48, the final radius of curvature which each location retains will be that radius of curvature which it had as it leaves the apparatus 48. Therefore, as each location on the workpiece leaves the apparatus 48, the roller pairs in the forming section 74 are controlled so that the radius of curvature of the roll-line profile through them equals the desired final radius of curvature of that location on the workpiece 46. As each location of the workpiece 46 enters the apparatus 48, the rollers pairs in the holding section 56 are controlled so that the radius of curvature of the roll-line profile through them equals the radius of curvature of that location on the incoming workpiece 46. Conforming the section 72 to the shape of the incoming workpiece 46 allows the rollers of this section to hold the workpiece 46 locally rigid and prevent it from rotating in space while it is being bent by the actions of the other roller sections.

Roller section 76, the laminar length adjusting section, deforms the workpiece 46 in such a way as to satisfy the constraint of constant laminar length. If roller sections 72 and 74 change the radius of curvature of the roll line profile, they cause changes in the gradient in laminar length across the workpiece thickness dimension 28. If no corrective means is provided, these changes in laminar length can fracture or buckle the fibers, as in FIG. 2(c). The laminar length adjusting section 76 imparts changes in the roll line profile which compensate for the changes in the laminar length gradient caused by the sections 72 and 74, so that the laminar lengths remain constant during deformation. The gradient in laminar length across the workpiece thickness dimension 28 is thereby controlled by the action of laminar length adjusting section 76 so that the fibers neither fracture nor buckle. This feature thus allows the apparatus to form a workpiece passing through it into an arbitrarily curved shape even though the material outside of the apparatus is rigid. In normal operation, no curvature is imposed by holding section 72, which follows the shape of incoming workpiece 46 and holds it without allowing rigid body rotation. The laminar length adjusting section 76 therefore functions by imposing on the workpiece 46 a deformation which is equal and opposite, in an algebraic sense, to that imposed by the forming section 74. Where the holding section 72 does impose a curvature, the laminar length adjusting section 76 imposes a deformation which is equal and opposite to the sum of the deformation imposed by the holding section 72 and the forming section 74. This is exemplary of kinematically admissible bending, which permits the introduction of bends into the composite material workpiece without causing the fibers to buckle or fracture.

Other arrangements for forming a composite workpiece into an arbitrarily curved final shape are possible, such as one schematically illustrated in FIG. 6. This apparatus includes a means 82 for determining the outgoing shape of the workpiece, a means 80 for holding the workpiece within the apparatus, and a means 84 for adjusting the laminar length.

As previously indicated, one of the most significant problems in forming bent or curved sections of fiber-containing composite materials is the creation of a detrimentally high compressive stress in the fibers on the side of the composite material toward which the workpiece 46 is being bent, termed the concave-going side. The thin fibers 22 behave as partially laterally supported elastic columns. These fiber columns can be buckled under a compressive stress, causing the fibers to become misaligned, so as to become less effective load-bearing elements and also causing wrinkling of the inner suface 36.

FIGS. 7 and 8 together illustrate the source of these compressive stresses, and one of the approaches to counteracting them. FIG. 7 depicts a workpiece 46, in the same view as FIGS. 2, bent to a curved shape under three-point bending induced by bending elements 84, which usually are the rollers 54. The stress state developed within the workpiece 46 is shown in the inset by a schematic graph of stress on the horizontal axis as a function of position in the through-thickness direction 28. The stress state produced by the bending alone is depicted as a bending stress line 86. The bending stresses 86 are negative or compressive, as indicated at numeral 88, adjacent the concave or inner surface 36 toward which the workpiece 46 is being bent; positive or tensile as indicated at numeral 90, adjacent the convex or outer surface 92; and pass through zero at an interior neutral point 94. If the bending is very slight, the magnitude of the compressive stress might be small and possibly acceptable. When the bending is more severe, the high compressive stress adjacent the inner surface 36 can buckle the fibers 44 and permanently wrinkle the inner surface 36.

A positive stress to counteract the compressive stresses can be applied to the surface of the workpiece 46 by proper external tractions, thereby reducing the total stress state to an acceptable level which does not buckle the fibers 44 or wrinkle the inner surface 36. The workpiece is driven forwardly in the travel direction 50 at a controlled velocity by some of the rollers 54, termed the drive rollers 96 and shown in FIG. 8. These drive rollers 96 turn in contact with the workpiece 46 as it travels through the apparatus 48 in the travel direction 50, and power is supplied to the drive rollers 96 to pull the workpiece 46 in the travel direction 50. Some of the rollers 54 can be used instead as drag rollers 98, which also are in contact with the surface of the workpiece 46 and turn with the workpiece, preferably without slipping, but to which is applied a rotational drag to retain their turning.

The stress induced by application of a dragging force on the surface of the workpiece 46, is shown as the drag stress 100, in FIG. 7. The drag roller 98 produces a surface traction opposite to the travel direction 50, thereby creating a tensile stress state that is approximately uniform across the thickness of the workpiece 40. Stresses within a material are summed at any particular point to produce a total stress 102 shown in FIG. 7. When a sufficient drag stress 100 is applied by retarding the drag roller 98, the total stress 102 is everywhere positive. With this state of stress, the fibers 22 are not placed into a net compressive stress state that would cause them to buckle, even adjacent the inner surface 36. In practice, small compressive total stresses can be tolerated, since the fibers 22 can resist small compressive total stresses without buckling. It is sometimes desirable to induce such a slight compressive total stress, since this tends to reduce the maximum tensile total stress adjacent the outer surface 92. If the fibers 22 approach their tensile fracture stress adjacent the outer surface 92, this compromise ensures the avoidance of both compressive buckling of the fibers 44 adjacent the inner surface 36 and tensile failure of the fibers 42 adjacent the outer surface 92.

The bending of the workpiece is accommodated by plastic shear of the matrix material. Because the plastic deformation is an incremental process, the directions of the stresses induced by bending depend upon the current direction of straining. Compressive stresses will tend to be induced on the side of the workpiece which is "concave going", i.e., becoming more concave if already concave or become less convex if already convex. Accordingly, the drive and drag forces are applied to the concave-going sides of the workpiece 46 within each of the three sections 72, 74 and 76. Since the workpiece 46 is pulled through the apparatus 48 at a fixed velocity by the drive rollers 96, the drive rollers 96 automatically exert a force necessary to balance the force created by the drag rollers 98.

Not all of the rollers 54 need be driven in the manner of drive rollers 96 or retarded in their rotation in the manner of drag rollers 98. Some of the rollers 54 can simply freewheel, or turn in contact with the surface of the workpiece without being driven or retarded. The freewheeling rollers 104 serve two functions. They help to define the roll-line profile and therefore to form the workpiece 46 by applying a perpendicular deforming force to the workpiece 46 at positions along the longitudinal extent of the workpiece 46, termed the station within the apparatus 48. The freewheeling rollers 104 also exert a compressive loading which maintains the workpiece 46 in a close turning contact with drive rollers 96 and drag rollers 98. The present apparatus is not used to thin the workpiece 46 in the through-thickness direction 28, in the manner of a conventional rolling mill, except for minor incidental thinning, and therefore the through-thickness stresses produced by the rollers 54 result from reacting against the workpiece 46, not from any intentional loading.

Figure 11:
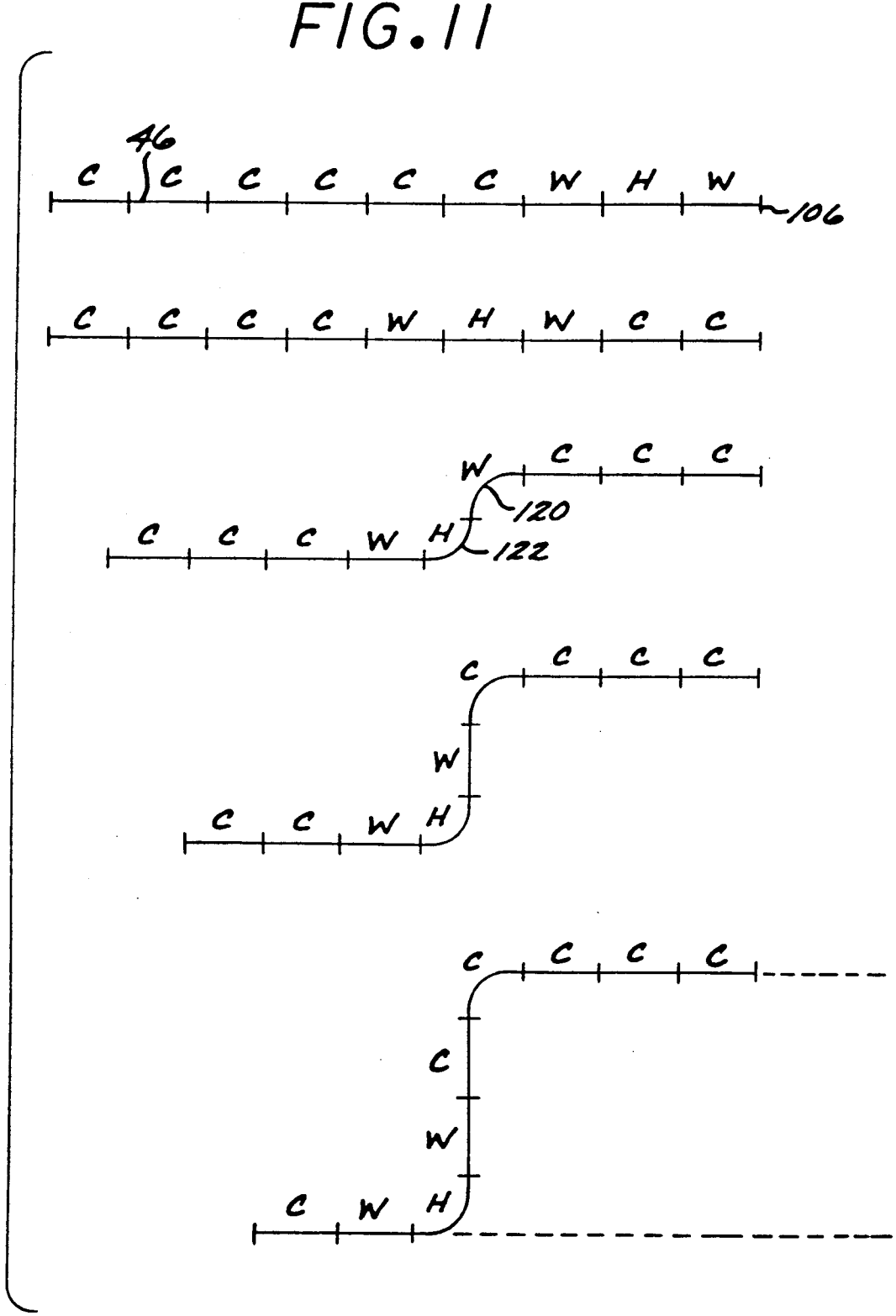
FIG. 11 is a schematic side elevational view of a composite workpiece undergoing progressive forming with no net bending of the component.
Figure 13A:
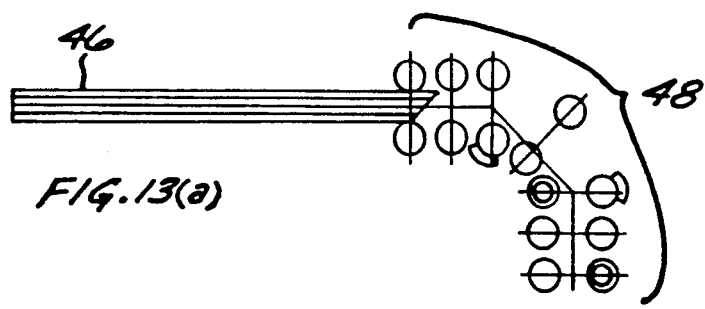
FIGS. 13(a), 13(b), 13(c), 13(d) and 13(e) are a schematic side elvational view of a composite workpiece undergoing progressive forming to an extended 90 degree bend, with the application of localized heating, showing in multiple parts the progression of the deformation and the positioning of the roller pairs.
Figure 13B:
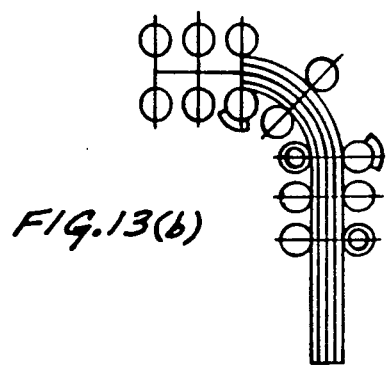
Figure 13C:
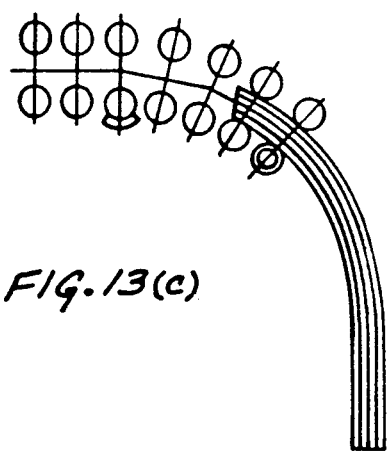
Figure 13D:
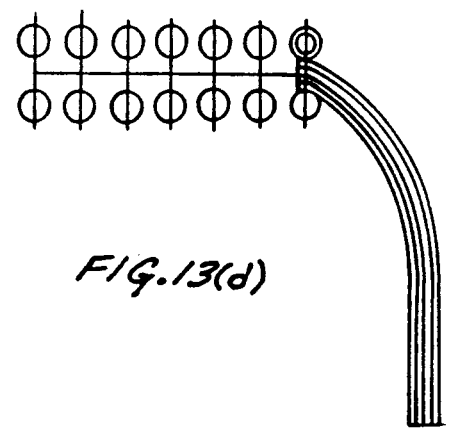
Figure 13E:
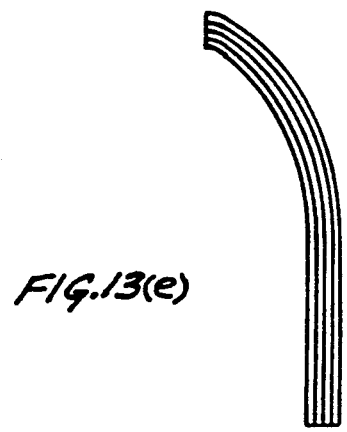

Forming of the workpiece 46 into a component without fracturing or buckling the fibers is also determined by the sequence of deformation. Two categories of components can be considered. The first includes components whose final shape contains a non-zero net bending between the two ends of the component, as illustrated in FIG. 10. The second category includes components which contain bends, but for which the net bending is zero, so that the total of bends in one direction is exactly compensated by the total of bends in the opposite direction, as illustrated in FIG. 11. Net bending is defined as the angle between tangents to the two ends of the workpiece 46, measured after all forming is complete, minus the same angle measured before forming is started.

Referring to the first category, FIG. 2 shows that a net bend cannot be introduced directly into the interior of a composite 20 while the matrix 24 on either side of the bend is rigid, because the fibers 22 would be fractured or buckled. The approach of the present invention produces a curvature in the workpiece 46 by first introducing the curvature into the leading edge or front end 106 of the workpiece 46, and then progressively moving the curvature through the workpiece 46 to its final position. Production of curvature in the workpiece 46 without changes in the laminar lengths is accomplished by shearing the workpiece in the through-thickness direction 28, as in FIG. 2(d), in the manner of bending a pack of cards while allowing individual cards to slide past each other. However, this shear strain is not readily accomplished with conventional die-forming equipment, because of the surface loadings and the size of the pieces being deformed. Progressive deformation produced by passing the workpiece 46 through the apparatus 48 allows introduction of a shear strain into the front end or leading edge 106 of the workpiece 46, and then the propagation of the shear strain along the length of the workpiece 46 until it reaches its desired position.

Progressive deformation is illustrated in FIG. 9, along with the preferred approach of progressively heating and cooling a location on the workpiece 46 as it passes through the apparatus 48, which again is shown schematically and without the detailed forming machinery. A bend 108 is introduced into the leading edge 106 of the workpiece 46 by the forming section 84 as the workpiece 46 enters the apparatus 48, as in FIG. 9(a). The portion of the workpiece 46 currently being bent is preferably heated in the hot zone 56 to a temperature that is sufficiently high that the matrix 24 can flow and shear freely, a temperature which is usually below, but may be above, the melting point of the matrix 24. The leading edge 106 of the workpiece 46 is an unconstrained free surface, and shear strains can there be introduced into the workpiece 46 so that the shear is accommodated by deformation of the free surface. Because of the unconstrained shear, no stress is placed on the fibers by the bending action at the leading edge 106.

The workpiece 46 continues to move forwardly in the travel direction 50, FIG. 9(b). The laminar length adjusting section 76 and the forming section 74 are configured so that the portion of the workpiece 46 which was previously bent in the earlier stage illustrated in FIG. 9(a) is unbent back to a straight profile at an unbending station 110, simultaneously with the adjacent portion of the workpiece 46 being bent the same amount at a bending station 112. In this manner, no new net shear strain is introduced into the workpiece 46 as it progresses through the apparatus 48. Since no new net shear strain is introduced, the laminar lengths 38 and 40, as well as all of the rest of the laminar lengths of the workpiece 46, remain unchanged. Since the laminar lengths do not change, the fibers 22 are not unduly stressed either in tension or compression. There may be incidental local stresses and strains in the workpiece 46, but any deleterious effect of these stresses can be negated by adding the drag forces previously discussed through the drag rollers 98. FIG. 9 illustrates the progressive deformation of the workpiece into a single bent portion, but much more complex shapes can be introduced and propagated by properly programming the pairs 52 of rollers.

The portion of the workpiece 46 within the apparatus 42 at any time is heated in the manner previously described. Adjacent the hot zone 56 are two warm zones 58 and 60. The workpiece 46 is first heated in the warm zone 58 before entering the hot zone 56. The workpiece 46 cools through the other warm zone 60 as it leaves the hot zone 56. Adjacent the warm zones are two cool zones 62 and 64 lying generally outside the apparatus 48. In conventional die-forming operations for producing curved composite workpieces, the entire workpiece must be heated to relatively high temperature, so that the matrix can flow readily to fill the die without distorting the fibers. For thermoplastic matrices, heating to the melting temperature is generally required. It is a particular advantage of the present approach that the temperature required for forming using the present apparatus is generally lower than used in die forming, and the workpiece is heated to that temperature for a shorter time. Because a lower maximum temperature is used in the present approach, the microstructure of the matrix 24 is not altered extensively during the forming operation. That is, a particularly preferred matrix material such as polyetheretherketone (PEEK) may be prepared to have a degree of crystallinity suitable for the ultimate application of the workpiece. If the workpiece is melted or heated to a very high temperature during forming, this pre-established crystallinity and its associated microstructure are lost, and the workpiece must be retreated to return the matrix to the desired state, after forming is complete. This retreating is highly undesirable, since the formed workpiece may warp when the matrix is retreated. Alternatively, the degree of crystallinity or other status of the matrix naturally produced by the conventional process must be accepted, even though it may not be optimal. Thus, the present approach produces fiber-containing composite material components that are not obtainable by any other known process, since the structure contains a pretreated matrix of desired characteristics and fibers which are not as highly stressed as in prior forming approaches and which retain their alignment without buckling.

FIG. 10 is a more complex variation of the first category of component, wherein there is a net bending. The net bending in the final component is 90 degrees, but is composed of two 45 degree bends. FIG. 10 also schematically illustrates the progression of the temperature pattern as the workpiece 46 moves progressively through the apparatus 48, but the apparatus is omitted from the figure for clarity. It is understood that the apparatus 48 is found at the locations where bending or unbending is occurring. A 90 degree bend is introduced into the leading edge 106 of the workpiece 48 as it moves in the travel direction 50. This leading edge 106 is heated to the hot temperature, indicated schematically in FIG. 10 as "H". Two warm zones "W" are adjacent the hot zone, and the rest of the workpiece, lying outside the apparatus 48, is in a cool zone "C". To progressively form the workpiece, the curved section is moved into the workpiece 46 by unbending the workpiece at unbending station 110 while simultaneously bending another location at bending station 112. Bending and unbending occur while the workpiece 46 is hot or moving between the hot and warm zones. The 90 degree bend 114 first introduced is distributed into two 45 degree bends 116 and 118 as progressive deformation continues. Because of the flexibility in the apparatus employing multiple pairs of rollers, initially introduced deformation may be manipulated into other configurations as progressive deformation continues.

Forming of the second category of component, having zero net bending, is illustrated schematically in FIG. 11. The workpiece enters the apparatus and stays flat until the location on the final component which is curved and nearest the leading edge 106 starts to emerge from the apparatus 48. Thereupon a first 90 degree bend 120 is introduced by the forming section 74, which determines the outgoing shape, and simultaneously a second 90 degree bend 122 of the opposite sign (termed a −90 degree bend) is introduced by the laminar length adjusting section 76, thereby maintaining the laminar lengths constant. The −90 degree bend 122 is then propagated to its desired location on the component as in the previous example.

The presently most preferred construction of the apparatus 48 is illustrated in FIG. 12. The apparatus is based on the use of three connected plates to form a roller mounting assembly, which supports and positions the pairs of opposed rollers. Holding plate 124 corresponds to holding section 72 of the previous discussion, forming plate 126 corresponds to the forming section 74 of the previous discussion, and laminar length adjusting plate 128 corresponds to laminar length adjusting section 76 of the previous discussion. The plates 124 and 128 are joined together so that they pivot about a common axle 130, and plates 128 and 126 are joined together so that they pivot about a common axle 132. Holding plate 124 may be viewed as fixed in space. The plates 126 and 128 are rotated in space with respect to plate 124 by the following mechanism. Mounted on plate 124 is a servomotor 134 which drives a gear 136. A meshing gear 138 is rigidly mounted to plate 128 so that the axis of rotation of the meshing gear 138 coincides with the axle 130. Operation of servomotor 134 rotates gear 136 and causes gear 138 to rotate, so that the plate 128 rotates with respect to plate 124. In a similar fashion, activation of servomotor 140 mounted on plate 128 causes a gear 142 to rotate, which turns a meshing gear 144 that is rigidly mounted to plate 126 at the axle 132. Plate 126 thence rotates about plate 128.

Each plate 124, 126 and 128 supports three pairs of rollers, but two pairs are jointly supported by two plates each at their common axle. The holding plate 124 supports roller pairs 146, 148, and 150. The laminar length adjusting plate 128 supports roller pairs 150, 152 and 154. The forming plate 126 supports roller pairs 154, 156 and 158.

The roller pairs 148, 152 and 156 are mounted in a similar fashion to each other at the centers of the respective plates along a line which is perpendicular to the line joining the pivot points of the other two pairs on that plate. Movement along this line creates an offset which allows the roller pairs to impose curvature on the workpiece passing between them. FIG. 12(c) illustrates the mechanism determining the positions of these roller pairs, using the roller pair 156 as an example. A sliding roller pair support 160 slides between bearings 162 mounted to the plate 126. The position of the sliding roller pair support 160 along its axis is determined by a hydraulic cylinder 164 acting against the support 160. The sliding roller pair support holds two other hydraulic cylinders 166 and 168, that control the positions of each of two roller bearing supports 169 that hold the rollers 54, which slide within slots 170 on the roller pair support 160.

FIG. 12(d) illustrates the mechanism for positioning the remaining roller pairs 146, 150, 154 and 158, which are mounted similarly and illustrated for roller pair 154. Each of these roller pairs do not have to slide together as a pair, but they do pivot together to accommodate the curvature of the workpiece. A pivoting roller pair support 172 pivots at its center. The pivot points of each pivoting roller pair support are indicated by triangles in FIGS. 12(a) and 12(d). The angular position of the pivoting roller pair support 172 is determined by a gear 174 driven by a servomotor 176 which is attached to the plate 126. The gear 174 meshes with a meshing gear 178 which is rigidly attached to the pivoting roller pair support 172, so that rotation of the meshing gear 178 rotates the roller pair support 172. The pivoting roller pair support 172 supports two hydraulic cylinders 180 and 182, which determine the positions of each of two roller bearing supports 184 which slide within slots 186 on the pivoting roller pair support 172. Each roller 54 is held at each end by a roller bearing support 184.

The mechanism for allowing any roller 54 within roller pairs 146, 148, 150, 152, 154, 156 and 158 to drive, drag, or freewheel is illustrated in FIG. 12(e). A motor 188 is attached to the axle of the roller 54 through a clutch 190 that controllably connects or disconnects the motor 188 with the roller 54. A brake 192 can retard the motion of the roller 54 to apply a drag force, when the clutch 190 has disconnected the motor from the roller 54. When the brake 192 is not activated and the motor 188 is disconnected from the roller 54 by the clutch 190, the roller 54 freewheels, or turns with the workpiece 46 but neither drives nor drags it.

The apparatus 48 is preferably provided with heating means to heat the portion of the workpiece 46 entering, and lying within the apparatus 48. The heating means is here illustrated as a number of radiant heaters 194, although any suitable heating means can be used. A number of heaters 194 is preferably provided, so that gradual heating and cooling can be accomplished. A cooling means such as a number of chill plates 196, cooled by internal coils, can be provided to establish particular cooling profiles in the workpiece 46 as it leaves the apparatus 48.

The results of the forming operation of the apparatus 48 can be monitored as forming proceeds by appropriate instrumentation, so that the information gained can be used to alter the process, either in real-time control or for subsequent runs. Three types of instrumentation are ordinarily provided. Heat sensing instruments are used to monitor the longitudinal temperature profile. These instruments can be simple or complex, and are here illustrated as simple thermocouples 198 in slight contact with the workpiece 46. A curvature monitoring instrument 200 and a fiber alignment monitoring instrument 202 can also be provided.

As will be evident, the control of the various elements of the apparatus 48 is critical to its successful operation, and a controller means is provided for this purpose. The controller means is illustrated in FIG. 12(f) as separated from the mechanical elements, but in reality it is connected with a complex network of hydraulic and electrical lines that are omitted from the figure for clarity of illustration. A roller mounting assembly controller 204 controls the mechanical positioning of the roller pairs 52 through operation of the various hydraulic and electrical subsystems previously described. A drive means controller 206 controls driving, braking, and freewheeling of the individual rollers 54. A heater controller 208 provides power to, and controls, the heating and cooling elements 194 and 196. An instrumentation controller 210 monitors and provides signals to the instrumentation 198, 200 and 202. The precise configuration of each of the controllers 204, 206, 208 and 210 is established by the type of unit chosen for performing each function, but such controllers will be known in the art for each such function. All of the controllers 204, 206, 208 and 210 are integrated by a computer 212, which is instructed with the sequence of roller mounting assembly commands, roller drive commands, and heater commands required for the forming of a particular workpiece. These commands are in accordance with the principles set forth herein, and are different for each particular type of forming operation.

FIGS. 13-16 illustrate four of the forming operations which are possible with the present apparatus and process, together with the general approach for controlling the rollers. The part produced by the approach of FIG. 13 is similar to a wing skin for an aircraft, which typically would be many feet in length and would require enormously large presses and furnaces if formed by conventional die forming. The part of FIG. 14 is a multiple reverse bend similar to ribs for an aircraft wing structure that would be difficult to form by die forming, since forces must be applied at a number of angles and directions. In forming this shape of workpiece, the roller pairs must be positioned in a serpentine fashion. FIG. 15 illustrates a U-bend and FIG. 16 a simple reverse bend similar to that depicted in FIG. 11.

The already formed portion of the workpiece 46 does not undergo any rigid body rotation as additional locations are formed, an important advantage of the invention. This can be seen from those portions of the workpieces in FIGS. 13-16 which lie outside and to the right of the forming apparatus. These portions do not rotate in space, but simply translate. Consequently, bending stresses at the juncture between these rigid portions of the workpiece just emerging from the apparatus and the forming apparatus are minimized, compared to the stresses which might be induced if the completed portions of the workpiece did have to undergo rotation as additional portions were formed.

The fabrication of singly curved, long in the straight direction panels of the type illustrated in FIGS. 17(c) and 17(d) requires the solution of the same type of laminar bending and constraint problem as discussed above in relation to FIG. 2, and the same approach utilizing the principle of kinematic admissibility. Most panels 300 contain some fibers lying in each direction 30 and 32, to provide bidirectional strength. An attempt to directly bend the workpiece 300 to form the U-shaped piece of FIG. 17(c) or the tapered U-shaped piece of FIG. 17(d), or other panels of this class, causes those fibers having their lengths parallel to the transverse direction 32 and lying near the inside face to be buckled, and those near the outside face to be fractured. While it is conceivable that a machine as discussed above in relation to FIGS. 2-16 could be used to produce the panels of FIGS. 17(c), such a machine would have to be as wide as the length of the panel. Another approach is therefore required.

In the bending of singly curved, long in the straight direction sections, the bending in the transverse direction is introduced from a transverse edge 302 as the workpiece 300 moves in the longitudinal direction 30 through a forming apparatus. The introduction of the net bending from the free edge permits the laminae to shear, thus maintaining kinematic admissibility and a constant laminar length throughout the transverse width of the panel. The bending is introduced gradually in a local forming region 306, that is propagated longitudinally along the length of the workpiece 300. Subsequent passes through the forming apparatus introduce further bending at the edge 302, if necessary, and propagate the bending in the transverse direction.

FIG. 18 illustrates the method for forming the workpiece 300 into a singly curved, long in the straight direction, tapered piece (of the type shown in FIG. 17(d)), which has a C-channel-shaped section at one end and an arch-shaped cross section at the other end. The workpiece 300 is passed in the longitudinal direction 30 through a forming apparatus, whose construction will be described subsequently. The workpiece 300 illustrated in FIG. 18 is shown as varying in thickness by the addition of extra layers of composite material in some regions. Deformation of the workpiece 300 is introduced from the transverse edge 302, see FIG. 18(b). However, the deformation is not introduced simultaneously all along the edge 302, but instead is introduced progressively as the workpiece 300 moves through the forming apparatus and the forming region 306 propagates along the length of the workpiece 300. In the forming region 306, the workpiece 300 is locally bent in the transverse direction by the forming apparatus, within a limited area. A single "pass" of the workpiece 300 through the forming apparatus, alternatively viewed as a single propagation of the forming region 306 through the workpiece 300 in the longitudinal direction 30, produces a bend all along the transverse edge 302, as illustrated in FIGS. 18(a)-18(d).

This progressive forming approach has important advantages that parallel those of the progressive forming approach discussed previously for singly curved, long in the curved direction parts. The forming apparatus is relatively small, because deformation occurs only in the forming region 306. The forming region 306 is relatively small and constant in size, independent of the size of the workpiece 300. A single forming apparatus may be used, as contrasted with the need to prepare individual dies for each type of closed die forming. Only the portion of the composite material within the forming region 306 is heated, if heating is required, so that the entire workpiece 300 is not heated for extensive periods of time. The deformation is introduced into the workpiece 300 in a kinematically admissible manner, so that the laminar lengths of the composite material panel remain constant. Such deformation is accomplished when the appropriate shear between the composite laminae on the inside and outside surfaces of the composite workpiece 300 is introduced from a free surface 302 and propagated transversely into the panel. The laminar lengths throughout the bending operation and in the final part therefore remain constant, the condition for avoiding buckling and fracturing of the fibers. Most importantly, because the geometry of the forming apparatus is adjustable, the positions of the forming elements can be changed continuously during each pass. This adjustability allows the apparatus to form components whose cross-sectional shape varies along their length, for example, tapered components.

The first pass through the forming apparatus, FIGS. 18(a)-18(d), introduces a portion 308 of the 180-degree net transverse bending present in the finished component into the transverse edge 302, along its entire length, as may be seen by comparing FIGS. 18(d) and 18(a). In a second pass, FIGS. 18(e)-18(h), the remainder 310 of the 180-degree net transverse bending is introduced at the transverse edge 302. As in the first pass, the bending is accomplished progressively as the forming region 306 is moved along the length of the panel 302 by moving the panel 302 through the forming apparatus. The final shape of the workpiece 300 after the second pass, FIG. 18(h), may be compared with the final shape after the first pass, FIG. 18(d), to observe the presence of the second bend 310 and the new position of the first bend 308.

After the second pass, the required 180-degree net bending has been introduced into the workpiece 300, but the individual bends are not yet in the proper transverse position relative to the panel transverse edges, as may be seen by comparing FIG. 18(h) with FIG. 17(d).

In a third pass, FIGS. 18(i)-18(l), the first transversely straight portion of the workpiece is generated while the 180-degree net bending remains trapped within the component. In a fourth pass, FIGS. 18(m)-18(p), the first final 90-degree bend present in the component is formed to its correct radius of curvature, and the remaining 90 degrees of net bending remains trapped in the component. In the fifth pass, FIGS. 18(q)-18(t), the straight segment of the workpiece which lies between the two 90-degree bends in the final shape is generated. At the right end, this segment has finite length, so that a C-channel shape is formed, while at the left end this segment has zero length so that an arch shape is formed. Passes subsequent to the fifth pass (not shown) could, as necessary, change the trapped 90-degree bend to a final radius of curvature which is correct at each longitudinal location, and leave the last transversely straight portion (having a different length at each end of the component). This shape is achieved in a kinematically admissible manner, using a compact forming apparatus and with only progressive local heating of the composite material in the workpiece 300.

FIG. 18 has depicted the fabrication of a complex section in only five passes, for the sake of maintaining a relatively compact illustration. Normally, the forming of a U-shaped section would involve at least 12-15 passes, so that in reality the shape changes indicated within each pass in FIG. 18 would be accomplished in at least 3 passes, whose net effect was that of the pass illustrated in FIG. 18. The deformation of the forming region 306 in, for example, FIG. 18(f), is more severe than normally attempted for the actual composite panel, again for the sake of the illustration. Also, in FIG. 18 the forming region 306 is always illustrated as propagating in the same longitudinal direction, right to left in the figure. The forming region may be propagated in either direction using the forming apparatus to be described.

In FIG. 18, the deformation introduced during each pass through the forming apparatus varies along the length of the workpiece 300. The resulting structure is the tapered section of FIG. 17(d). Such tapered shapes can at present be made only be fixed-die methods.

The prior discussion of the method of introducing and propagating kinematically admissible deformation into a composite workpiece 300 has dealt with a particular U-shaped section, for the purposes of definiteness in illustration. Other forms and shapes of transverse bending may likewise be introduced into, and propagated throughout, the composite panel using the same approach.

Figure 19:
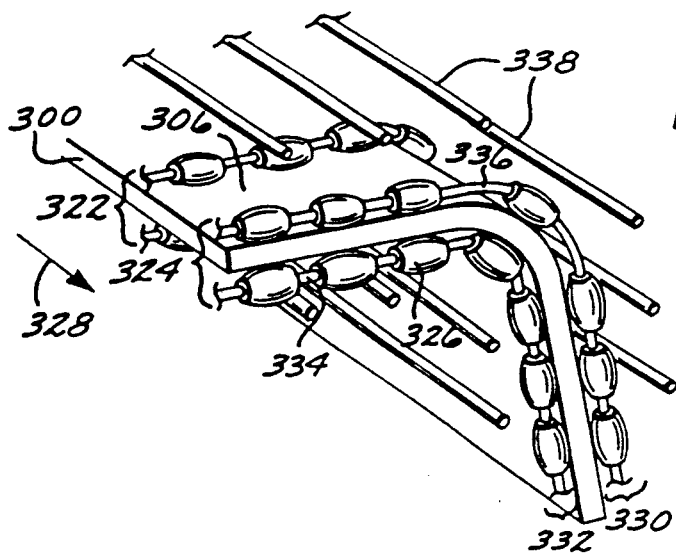
FIG. 19 is a perspective view of a transverse bending apparatus.

Several different structures are possible for the forming apparatus used in longitudinal bending of panels, in the manner illustrated in FIG. 18. One type of forming apparatus 320 is illustrated in FIG. 19. The apparatus 320 includes a leading group 322 and a trailing group 324 of barrel-shaped rollers 326. The leading group 322 is the group of rollers first encountered by the workpiece 300 as it moves in the direction of the arrow 328, which is parallel to the longitudinal direction 30. Each of the two groups of rollers 322 and 324 includes an upper set of rollers 330 and a lower set of rollers 332, the upper set 330 being on one side of the workpiece 300 and the lower set 332 being on the other side of the workpiece 300.

Each set of rollers in turn includes seven barrel shaped rollers 326 on an axle 334. Each roller 326 is barrel shaped, having a diameter greater at the center than at the ends. The rollers 326 are capable of being independently driven, although in most cases the rollers 326 are permitted to freewheel. (Where necessary, the rollers 326 could be made to apply forward (drive) surface traction, reverse (drag) surface traction, or no (idle) surface traction.) The axle 334 has pivot points and a telescoping mechanism 336 between individual rollers 326 that permit the axle 334, and the rollers 326 mounted thereupon, to be pivoted and extended to achieve the arbitrary shapes required to produce the deformations required for progressive transverse bending.

During operation, the leading group 322 of rollers traces the existing shape of the workpiece 300 prior to introduction of further bending, and the trailing group 324 of rollers is placed into a different configuration to accomplish bending of the workpiece 300 in the transverse direction. The forming region 306 is therefore the limited area in the workpiece 300 between the two groups of rollers 322 and 324. A heater 338, such as a resistance, infrared, microwave, or induction heater is placed adjacent the forming region 306 to heat the workpiece 300 in that region. The portion of the workpiece 300 within the region 306 is therefore readily deformed, while the portion outside the region 306 is relatively rigid, for most composite materials of practical interest.

The forming apparatus 320 requires a total of 28 rollers and highly coordinated operation between the groups 322 and 324. Another, less complex and more preferred approach requiring only 4 rollers in its general form, is illustrated as the forming apparatus 350 in FIGS. 20 and 21. The panel workpiece 300 is held by a clamp 352, which in turn is mounted to translate in the longitudinal direction 30 on a slide 354, and to be moved in the transverse direction 32 by actuators 356. The panel workpiece 300 is moved in the longitudinal and transverse directions relative to a forming unit 358, to accomplish the forming operation.

Figure 21:
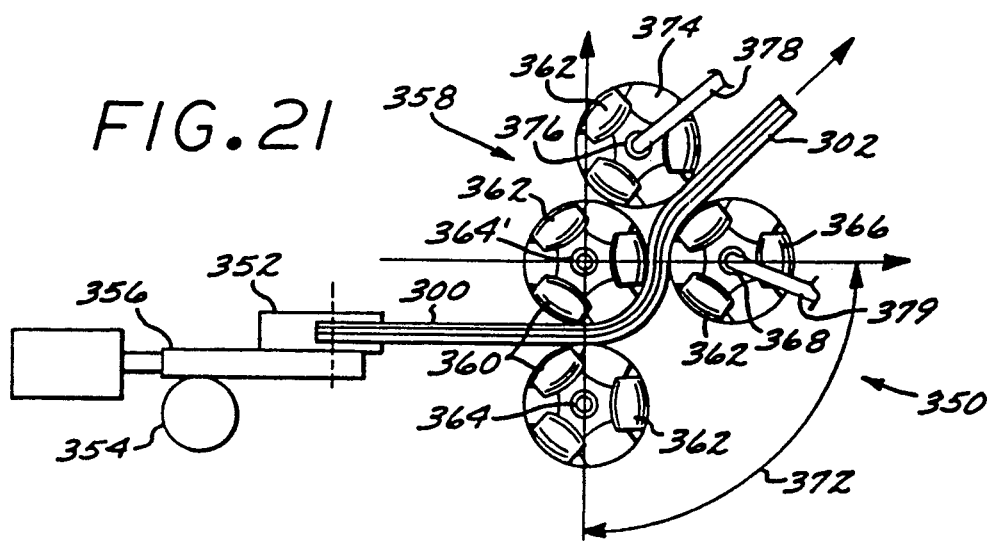
FIG. 21 is an elevational view of the apparatus of FIG. 20, viewed in a direction parallel to the longitudinal direction.

The forming unit 358 is best understood by reference to FIG. 21. The view of FIG. 21 is parallel to the longitudinal direction 30. Although upon first impression it might appear that the workpiece 300 is moving from left to right in the view of FIG. 21, in fact the principal direction is out of the plane of the page during each pass. There is typically an increment from left to right between passes, so that the bite of the forming unit 358 is moved from the right toward the left of the workpiece 300. The multipass, programmable deformation illustrated in FIG. 18 is thereby accomplished.

Figure 23:
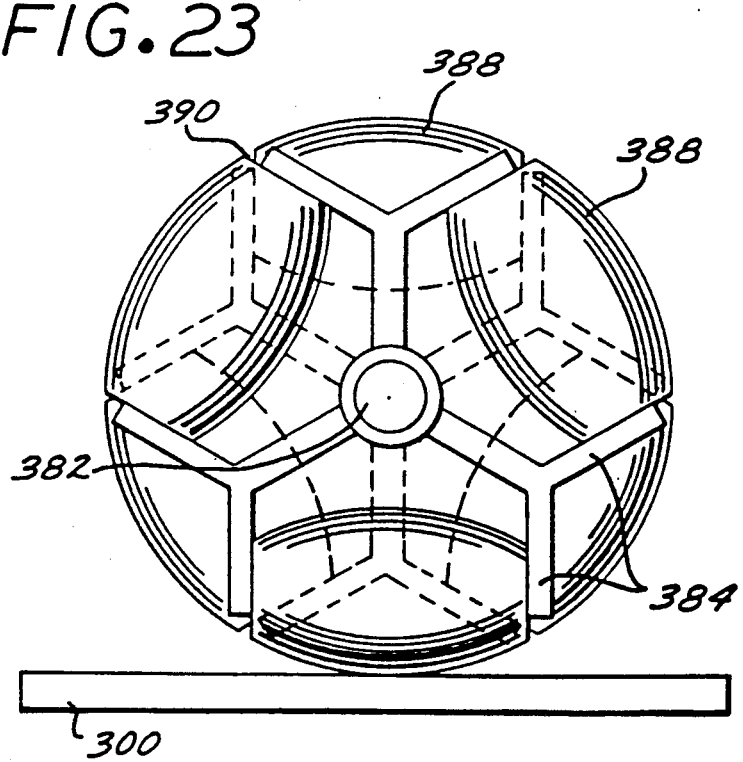
FIG. 23 is an elevational view of a compound roller.

The forming unit 358 includes a pair 360 of compound rollers 362, whose structure will be described in more detail in relation to FIG. 23. Each roller of the pair 360 is mounted on an axle 364 that is parallel to the longitudinal direction 30. The axle 364 may be driven to apply a surface traction, retarded to apply a surface traction, or allowed to freewheel. The rollers of the pair 360 are spaced sufficiently far apart that they contact the surface of the workpiece 300 along a vertical line through their axles 364. The axles 364 may be moved vertically to increase the opening between the rollers of the pair 360, but do not tilt or otherwise change angular orientation.

A first compound bending roller 366 is mounted on an axle 368 that is parallel to the longitudinal direction 30. The axle 368 is supported on an articulated first roller support 370 that permits it to swing in a circular arc whose center is one of the axles 364 of the pair 360 of compound rollers. The radius of the circular arc is the radius of the roller on whose axle 364 the radius is centered, plus the thickness of the composite material workpiece 300, plus the radius of the first compound bending roller 366. Referring to FIG. 21, the circular arc of the axle 368 of the first bending roller 366 is centered on the upper axle 364' of the upper one of the pair 360, and has a radius such that the roller 366 rotates in a counterclockwise fashion at a sufficient distance from the upper roller of the pair 360 that the workpiece 300 is captured therebetween.

Figure 20:
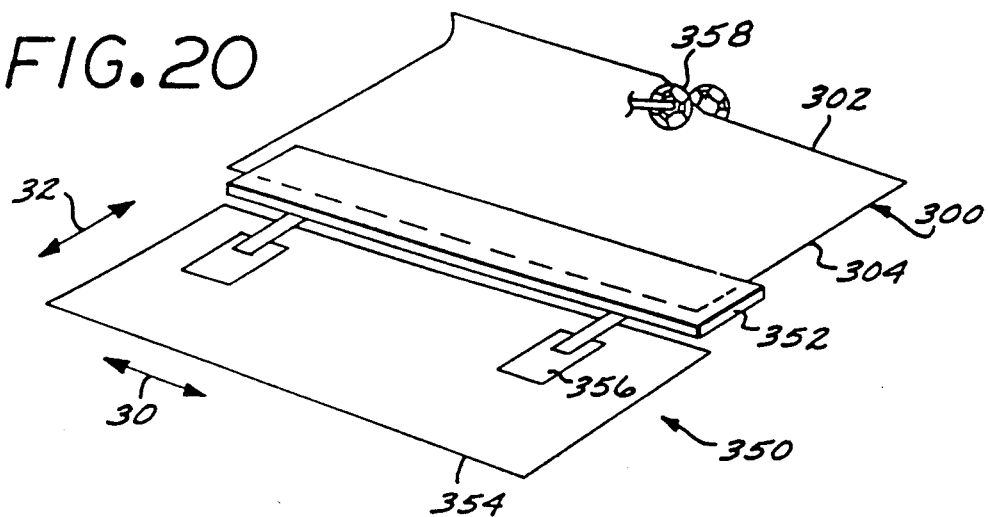
FIG. 20 is a perspective view of a second transverse bending apparatus.

Recalling that in the view of FIG. 21 the workpiece 300 is translating outwardly out of the plane of the page, it is seen that the bending roller 366 causes the transverse edge 302 to be deflected upwardly, introducing an upward bend into the edge 302 of the workpiece 300 at all points at which the forming unit 358 has passed. This deflection is depicted in the perspective view of FIG. 20. The bend introduced can be a 90 degree bend, as depicted in FIGS. 20 and 21, but can also be made greater or less than 90 degrees by maintaining the bending roller 366 at a greater or lesser degree of rotation during the longitudinal pass. The angle of the introduced bend could also be varied during the pass, by changing the angular rotation 372 of the bending roller 366 during the pass. In this manner, a variety of shapes of transversely bent structures may be formed. The condition of kinematic admissibility is maintained during the bending operation, because the bends are introduced from the free transverse edge 302 of the workpiece 300. When the first pass has been completed, the panel has the appearance shown in FIG. 18(d). Other bends such as the second 90 degree bend 310 of FIG. 18 may be introduced by passing the bent panel of FIG. 18(d) through the forming unit 358 in a second pass, with the workpiece 300 moved laterally to the right by the actuators 356 by the proper amount. The remaining steps of producing the U-shaped structure of FIG. 18 may be similarly accomplished.

The first bending roller 366, in cooperation with the pair 360 of rollers, permits introduction of transverse bends into the composite workpiece 300 of a concave upward shape, as viewed in FIG. 21. However, for complex shapes it may be necessary also to introduce concave downward bends into the panel on the same pass or subsequent passes. A second bending roller 374, mounted on an axle 376 that is parallel to the longitudinal direction 30, permits the introduction of concave downward bends in the manner illustrated in FIG. 22. The axle 376 is supported on a second articulated roller support 378 to pivot in a circular arc whose center is the axle 368 of the first bending roller 366, and whose radius is the radius of the first bending roller 366, plus the thickness of the workpiece 300, plus the radius of the second bending roller 374.

Figure 22:
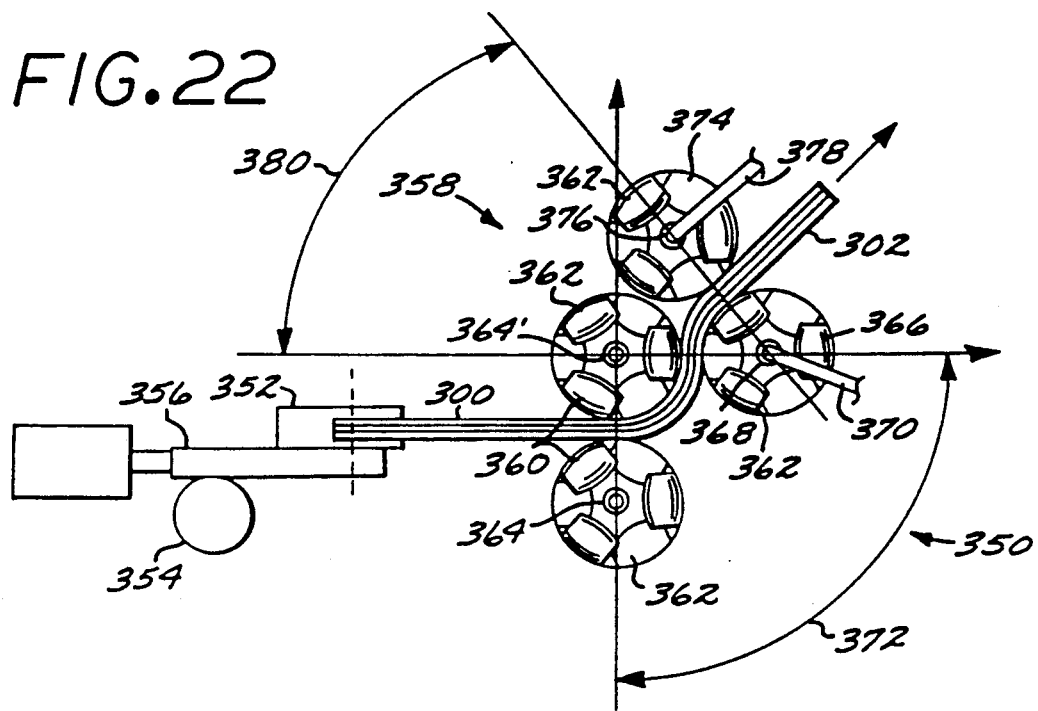
FIG. 22 is an elevational view of the apparatus of FIG. 21, including a second bending roller.

As shown in FIG. 22, the second bending roller 374 bends the workpiece 300 around the first bending roller 366, to introduce a concave downward bend into the workpiece 300. The angle of the concave downward bend is determined by the angle 380 in FIG. 22. As with the concave upward bend produced by the bending action of the first bending roller 366, the concave downward bend is introduced from the transverse edge 302, to maintain the condition of kinematic admissibility. The compound bending is then propagated from the edge 302 toward the central regions of the workpiece 300 by manipulating the positions of the rollers during subsequent passes.

The various combinations of deformation that are required to fabricate arbitrary transverse curvatures are developed through manipulating the positions of the bending rollers 366 and 374, in coordination with the transverse feed of the workpiece 300, during successive longitudinal passes of the workpiece 300 through the forming unit 358. The required control is normally achieved using a control computer that determines the required curvature to be introduced during each pass, which by geometry determines the position of the rollers 366 and 374 required to accomplish the curvature. The rollers are pivoted about their axles to produce such curvatures.

A key feature of the forming unit 358 is the use of the compound roller, an element that permits the workpiece 300 to roll over it in either the transverse or longitudinal direction with minimal friction. The preferred compound roller 362 is illustrated in FIG. 23. The roller 362 includes a hub 382 having six support arms 384 projecting outwardly therefrom. Three of the support arms 384 are in one plane, and are spaced with their axes 120 degrees apart. Three of the support arms 384 are in a second plane, parallel to the first plane but displaced therefrom, and are spaced with their axes 120 degrees apart. The two sets of support arms 384 are offset by 60 degrees from each other.

An axle 386 extends between each of the support arms 384 in the first plane, and between each of the support arms 384 in the second plane. A roller 388 is rotatably supported on each axle 386. The profile of each roller 388 is shaped so that the projection of the outmost extent of the central portion of each roller 388 lies on a circle 390. When the compound roller 362 contacts the surface of the workpiece 300, it may roll in one direction in the plane of the workpiece 300 through the rotation of the roller 388 on its axle 386, and in the perpendicular direction in the plane of the panel by rotation of the hub 382 on its axle.

The approach of the forming apparatus 350 is preferred over that of the apparatus 320. The apparatus 350 accomplishes general bending of the composite in a succession of passes, using only four rollers. When only four rollers are used, the complexity of the system is greatly reduced and better mechanical reliability is achieved. The development of complex forming algorithms is also more readily accomplished. The positioning of the rollers under either approach must be controlled by a computer controller, and the reduced number of rollers reduces the instrumentation and control that are required. The bends made with the apparatus 350 have a controllable minimum radius of curvature equal to the diameter of the rollers, reducing the chance of damage to the composite material by making too sharp a bend. Sharp bends can be achieved where possible by using smaller rollers where needed. The constant radius of curvature also permits closer control over the heating of the composite material.

The use of the compound rollers of the apparatus 350 also permits the workpiece panel to be drawn transversely into the forming unit 358 by applying a traction to the surface of the panel through the rollers of the pair 360, or the other rollers 366 and 374, as necessary.

The apparatus 350 also avoids the need for a second set of rollers to hold the panel during forming. The complexity of the apparatus is thereby reduced. Equally importantly, the forming region adjacent the forming unit 358 is permitted to extend a greater distance, relieving stresses in the panel and permitting greater bending deformations with each bite. Fewer passes are then required to accomplish a required bending and propagation.

The composite material that is formed using any of the processes or apparatus discussed herein may be a fully consolidated composite material, or may be a partially consolidated or unconsolidated composite material. Many types of composite materials are prepared by laying up the fibers and matrix, either in prepreg form or separately, and then consolidating the layup under heat and pressure. Since heat is often applied in the forming operations, and pressure may be applied by spacing the forming rollers or other elements at a distance less than the composite thickness, the forming operation itself can be used to perform the consolidation of the composite material.

Thus, consolidation and forming may be accomplished concurrently, eliminating the need for costly autoclaves and other forming apparatus normally utilized in the consolidation operation. The concurrent consolidation and forming approach has the additional advantage that the laminates of the composite material shear past each other more easily before consolidation is complete, so that less force is required in forming and the laminates are consolidated into the shape in which they are ultimately utilized.

It will now be seen that the present invention represents a new approach to the forming of composite material workpieces, which produces shapes not heretofore possible, with minimal adverse impact on the microstructure and performance of the material. Workpieces of many shapes can be fabricated in sizes much larger than the forming apparatus itself. The need for long-lead-time procurement of dies is eliminated, and the development engineer is given much greater flexibility in modifying the design of parts to optimize them. Indeed, a workpiece that is unsatisfactory in its first run can be rerun at a later time. Although a particular embodiment of the invention has been described in detail for purposes of illustration, various modifications may be made without departing from the spirit and scope of the invention. In one modification, doubly curved components may be formed. The apparatus of the presently preferred embodiment, being based on rollers, can readily form singly curved components, which are curved along one direction but are straight along the other. The same principles can, however, be applied to the forming of doubly curved components. Accordingly, the invention is not to be limited except as by the appended claims.

What is claimed is:

1. A process for continuously and progressively forming transverse bends in a workpiece of a fiber-containing composite material, comprising the steps of:
   supplying a workpiece of a fiber-containing composite material having fibers embedded within a matrix; and
   passing the workpiece in a longitudinal direction through apparatus having transverse bending elements extending in a transverse direction perpendicular to the longitudinal direction, the elements permanently bending the composite material to change its curvature in the transverse direction by introducing a net bending deformation into a transverse edge of the workpiece, the transverse edge of the workpiece being a margin of the workpiece that is intersected by a line lying parallel to the transverse direction, and
   progressively propagating the introduced net bending deformation transversely through the workpiece in successive passes of the workpiece through the bending elements, the propagating being accomplished such that the transverse laminar length of the workpiece remains substantially unchanged during the forming process.

2. The process of claim 1, wherein the workpiece is locally heated in the region of the bending elements to a temperature sufficiently high to permit interlaminar shear of the composite material.

3. The process of claim 2, wherein the temperature of local heating is below the melting point of the matrix.

4. The process of claim 1, including the further step of grasping the workpiece with a grasping means for moving the workpiece through the apparatus in both the transverse and the longitudinal directions.

5. The process of claim 1, wherein the bending elements include pairs of rollers between which the workpiece passes during deformation.

6. The process of claim 1, wherein the positions of the bending elements are changed between successive passes to accomplish the step of progressively propagating.

7. The process of claim 1, wherein the positions of the bending elements are changed during each pass to accomplish the step of progressively propagating.

8. The process of claim 1, wherein the composite workpiece is not consolidated prior to the step of passing, and wherein, in the step of passing, the transverse bending elements are positioned to consolidate the composite workpiece.

9. A process for continuously and progressively forming a workpiece of a reinforced composite material, comprising the steps of:
   supplying a workpiece of a reinforced composite material having reinforcements embedded within a matrix; and
   passing the workpiece in a longitudinal direction through apparatus having transverse bending elements extending in a transverse direction lying perpendicular to the longitudinal direction, the elements permanently bending the composite material to change its curvature in the transverse direction by propagating a bending deformation progressively through the workpiece in successive passes of the workpiece through the bending elements, the propagating being accomplished such that the laminar length of the workpiece, in the transverse direction, remains substantially unchanged during the forming process.

10. The process of claim 9, including the further step of:
introducing a net bending deformation into a transverse edge of the workpiece, so that the completed workpiece has a net bending deformation, prior to the step of passing, the transverse edge of the workpiece being a margin of the workpiece that is intersected by a line lying parallel to the transverse direction.

11. The process of claim 9, wherein the composite workpiece is not consolidated prior to the step of passing, and wherein, in the step of passing, the transverse bending elements are positioned to consolidate the composite workpiece.

12. The process of claim 9, wherein the positions of the bending elements are changed during the pass of the workpiece through the bending elements.

13. The process of claim 9, wherein the step of passing is repeated, with the positions of the bending elements changed between successive passes.

14. The process of claim 1, wherein the bending elements include at least one pair of opposing rollers and a single roller.

15. The process of claim 14, wherein at least some of the rollers are compound disk rollers.

* * * * *